United States Patent
Evans et al.

(10) Patent No.: US 6,311,060 B1
(45) Date of Patent: *Oct. 30, 2001

(54) METHOD AND SYSTEM FOR REGISTERING THE LOCATION OF A MOBILE CELLULAR COMMUNICATIONS DEVICE

(75) Inventors: Thomas F. Evans, Stone Mountain; Edward I. Comer, Marietta; David J. Britain, Lawrenceville, all of GA (US)

(73) Assignee: Cellemetry LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/083,079

(22) Filed: May 21, 1998

(51) Int. Cl.[7] .................................................. H04Q 7/20
(52) U.S. Cl. ........................ 455/426; 455/458; 455/466
(58) Field of Search .................................. 455/426, 31.1, 455/440, 444, 456, 435, 436, 466, 458, 445, 515; 379/52, 68, 69, 60, 115, 118

(56) References Cited

U.S. PATENT DOCUMENTS

| | | | |
|---|---|---|---|
| 4,866,445 | 9/1989 | Valero et al. | 341/106 |
| 4,905,234 | 2/1990 | Childress et al. | 370/94.1 |
| 5,010,584 | 4/1991 | Seki | 455/83 |
| 5,031,204 | 7/1991 | McKernan | 379/63 |
| 5,210,787 | 5/1993 | Hayes et al. | 379/60 |
| 5,218,367 | 6/1993 | Sheffer et al. | 342/457 |
| 5,255,307 | 10/1993 | Miziovsky | 379/58 |
| 5,341,410 * | 8/1994 | Aron et al. | 379/59 |
| 5,363,427 | 11/1994 | Ekstrom et al. | 379/58 |
| 5,371,898 | 12/1994 | Grube et al. | 455/33.1 |
| 5,396,537 | 3/1995 | Schwendeman | 379/57 |
| 5,396,539 * | 3/1995 | Slekys et al. | 379/59 |
| 5,493,722 | 2/1996 | Gunn et al. | 455/54.1 |
| 5,502,761 | 3/1996 | Duncan et al. | 379/142 |
| 5,511,072 | 4/1996 | Delprat | 370/68.1 |
| 5,511,110 | 4/1996 | Drucker | 379/57 |
| 5,526,401 * | 6/1996 | Roach, Jr. et al. | 379/59 |
| 5,528,664 | 6/1996 | Slekys et al. | 379/58 |
| 5,539,810 * | 7/1996 | Kennedy, III et al. | 379/59 |
| 5,544,223 | 8/1996 | Robbins et al. | 379/58 |
| 5,546,444 * | 8/1996 | Roach, Jr. et al. | 379/59 |
| 5,596,573 | 1/1997 | Bertland | 370/474 |
| 5,610,973 | 3/1997 | Comer | 379/59 |
| 5,625,889 | 4/1997 | Chikkaswamy et al. | 455/67.1 |
| 5,652,570 | 7/1997 | Lepkofker | 340/573 |
| 5,680,551 | 10/1997 | Martino, II | 395/200 |
| 5,686,888 | 11/1997 | Welles, II et al. | 340/539 |

(List continued on next page.)

Primary Examiner—William Trost
Assistant Examiner—Tilahun Gesesse
(74) Attorney, Agent, or Firm—Kilpatrick Stockton LLP

(57) ABSTRACT

Identifying and registering the location of a mobile data reporting device operating within the coverage areas of a cellular mobile radiotelephone (CMR) system. The mobile data reporting device travels freely between CMR systems and is operative to communicate selected data collected from data sources to a data collection system via control channels of the CMR system. The location registration system enables the data collection system to transmit a data message to the mobile data reporting device via the control channels of the particular CMR system within the coverage areas of which the mobile data reporting device resides. Each CMR system transmits a beacon page that distinguishes the CMR system from adjacent CMR systems. When the mobile data reporting device receives a beacon page that is different from a previously received beacon page, the mobile data reporting device generates a beacon-responsive signal. The beacon-responsive signal is transmitted to the data collection system and enables the data collection system to determine the location of the mobile data recording device. Because the particular CMR system is identified, the data collection system can transmit a data message to the mobile data reporting device without flood paging all of the CMR systems in which the mobile data reporting device might be located.

27 Claims, 9 Drawing Sheets

U.S. PATENT DOCUMENTS

| | | | |
|---|---|---|---|
| 5,701,302 | 12/1997 | Geiger | 370/521 |
| 5,722,067 | 2/1998 | Fougnies et al. | 455/406 |
| 5,754,954 | 5/1998 | Cannon et al. | 455/419 |
| 5,781,612 | 7/1998 | Choi et al. | 379/58 |
| 5,794,144 | 8/1998 | Comer et al. | 455/426 |
| 5,797,097 * | 8/1998 | Roach, Jr. et al. | 455/456 |
| 5,805,997 | 9/1998 | Farris | 455/461 |
| 5,826,195 | 10/1998 | Westerlage et al. | 455/456 |
| 5,845,203 | 12/1998 | LaDue | 455/414 |
| 5,873,043 | 2/1999 | Comer | 455/458 |
| 5,901,142 * | 5/1999 | Averbuch et al. | 370/329 |
| 5,924,026 | 7/1999 | Krishnan | 455/414 |
| 6,018,657 * | 1/2000 | Kennedy, III et al. | 455/426 |
| 6,169,895 * | 1/2001 | Buhmann et al. | 455/423 |

* cited by examiner

METHOD AND SYSTEM FOR REGISTERING THE LOCATION OF A MOBILE CELLULAR COMMUNICATIONS DEVICE

RELATED APPLICATION

This application is related to application Ser. No. 08/622,438, filed Mar. 25, 1996, and is related to application Ser. No. 08/212,039, filed Mar. 11, 1994, which issued as U.S. Pat. No. 5,546,444.

TECHNICAL FIELD

The present invention relates generally to communicating data via a cellular network control channel of a cellular mobile radiotelephone system and more particularly relates to a method and apparatus for triggering the registration of the location of a mobile cellular communications device.

BACKGROUND OF THE INVENTION

In recent years, the communications industry has shown a growing interest in various types of wireless communications systems for communicating voice and/or data between numerous remote sites and a central location. It is well recognized that the use of a dedicated telephone facility for a conventional telephone system is not a convenient or economical option for all communications applications. For example, individuals who must be away from their base of operations have a need to conveniently and efficiently communicate with their base. Likewise, for many industrial applications, a central data collection site has a need for acquiring information from a variety of remotely located monitoring devices that collect data about the operation or performance of equipment. To overcome the limitations of a conventional telephone system, a two-way wireless communications link is often necessary to permit a response to a communication initiated from another location. In an attempt to solve the problem of supplying a response to an initial communication, the industry has offered various wireless communications systems, such as mobile radiotelephones.

One form of two-way communications is a cellular mobile radiotelephone (CMR) system, which is connected to the extensive public switched telephone network (PSTN) and permits communications between a mobile radiotelephone user and anyone with a conventional telephone (or another radiotelephone). Typical CMR systems are characterized by dividing a radio coverage area into smaller coverage areas or "cells" using low power transmitters and coverage-restricted receivers. As shown in U.S. Pat. Nos. 3,906,166 and 4,268,722, the limited coverage area enables the radio channels used in one cell to be reused in another cell. As a cellular mobile radiotelephone within one cell moves across the boundary of the cell and into an adjacent cell, control circuitry associated with the cells detects that the signal strength of the radiotelephone in the just-entered cell is stronger, and communications with the radiotelephone are "handed-off" to the just-entered cell. Thus, a CMR system can supply two-way communications for an array of cells, thereby supplying communications for a much wider area than conventional two-way radios.

A radiotelephone can "roam" between CMR systems and still place calls as well as remain accessible to receive calls from other callers. This is accomplished by means of a roaming system. Usually, a radiotelephone has a "home" CMR system in which the radiotelephone's Mobile Identification Number (MIN) and billing account are initially established. Because many CMR systems are capable of communicating information between themselves, the roaming system permits a home CMR system to contact a roaming radiotelephone by sharing information with a "foreign" CMR system. A CMR system can contact a radiotelephone and inform it about an incoming call by transmitting a Mobile Station Control Message to the radiotelephone within the cell in which the radiotelephone resides.

The most common of these Mobile Station Control Messages is commonly referred to as a "page", which is carried within a Mobile Station Control Message over a cellular network control channel. By monitoring the cellular network control channel, a radiotelephone within the CMR system can receive and analyze each page that is transmitted by the CMR system. Among other information, a page includes the MIN of the radiotelephone to which a connection is sought. The radiotelephone responds to a page that contains the MIN assigned to the radiotelephone. To avoid paging radiotelephones in every CMR system when a call is attempted, many CMR systems keep track of which radiotelephones are in the CMR system's coverage area.

Generally, a radiotelephone will monitor a cellular network control channel which transmits Mobile Station Control Messages including information such as the CMR system's System Parameter Overhead Message (SPOM) and the Global Action Overhead Message (GAOM). When the radiotelephone roams from its home CMR system and into a foreign CMR system, it will lose contact with the home CMR system's cellular network control channel, which is referred to as "losing synch." When a radiotelephone loses synch, it will scan the range of available radiotelephone frequencies for a new cellular network control channel. Where the radiotelephone has roamed into the coverage area of a foreign CMR system, the new cellular network control channel will be transmitting a control message that identifies the foreign CMR system. One way the control message can be used to distinguish the transmitting CMR system from other CMR systems is by including a unique System Identification Number (SID) with the control message's data. The monitoring radiotelephone will then recognize that the SID contained in the current control message is different from the SID of the control message that was previously received and will transmit an autonomous registration signal.

The autonomous registration signal tells the foreign CMR system that the radiotelephone is roaming and identifies the radiotelephone's home system. After contacting the radiotelephone's home CMR system and verifying that the roaming radiotelephone is a valid user of the home CMR system, the foreign CMR system will enable the radiotelephone to operate in the foreign CMR system as if the radiotelephone were in its home CMR system. Thus, the roaming radiotelephone can place and receive calls. Because the radiotelephone is registered as a user in the foreign CMR system, pages corresponding to calls being made to the radiotelephone need only be broadcast in the CMR system where the radiotelephone is registered.

A conventional CMR system operates on a 50 MHz range of frequencies in the 800 MHz and 2,000 MHz frequency bands. The frequency range is divided into channels which can transmit either control data or voice data. The control data is used to setup incoming and outgoing radiotelephone calls. The channels which carry such control data are the cellular network control channels, which are also described as "control channels." When a radiotelephone user attempts to place a call, the radiotelephone transmits control data over the control channel to the CMR system. This control data will be transmitted in the form of a "call origination signal" which alerts the CMR system to the user's desire to place a call. The CMR system responds by transmitting control data to the radiotelephone via the control channel to assign another channel (a voice channel) that can be used to transmit voice data (i.e., the callers' conversation). A conventional CMR system typically has 42 control channels that are divided into two sets of 21 control channels. Separate radiotelephone carriers (designated as Carrier A or Carrier B) can provide radiotelephone service support for the individual sets of control channels. For the purposes of this discussion, a radiotelephone will be referred to as being tuned to either "System A" or "System B", depending on the set of control channels that the radiotelephone is using to communicate.

A conventional CMR system has both cellular network control channels and cellular network voice channels. Generally, the control channels permit the transmission of the information used by the CMR system to complete a call placed by a radiotelephone or placed to a radiotelephone. The voice channels, on the other hand, are used to transmit the voice communications of the calling party and the called party, as well as a limited occasional amount of data related to the established voice communications (e.g., a power level change order). A conventional CMR system utilizes the control channels for a relatively short time to complete a call, as compared to the time that the CMR system must utilize the voice channels to permit a conversation between the parties.

Cellular network control channels are typically divided into two varieties. For communications originating with the CMR system's cell and directed toward a radiotelephone (i.e., in a forward direction), a Forward Control Channel (FOCC) is used. For communications from a radiotelephone toward the CMR system's cell (i.e., in the reverse direction), the Reverse Control Channel (RECC) is used. When a radiotelephone places a call, it sends a signal over the RECC to establish a connection with the cell so that the call can be placed and a voice channel can be allocated to enable conversation between the calling parties. On the other hand, when another party seeks to place a call to a radiotelephone user, the cell receives the incoming call request and transmits a page over the FOCC that notifies the radiotelephone that a connection is sought by the incoming call.

U.S. Pat. No. 5,546,444 describes a system for obtaining data and communicating data (rather than voices) over the control channels of a CMR system. Utilizing the control channels to communicate data conserves the valuable frequency spectrum allocated for the voice channels that support normal telephone conversations on the CMR system. Because the system can be implemented within the confines of a conventional CMR system, no significant modification is required to accommodate the ability to communicate data over the control channels.

An example of the use of a control channel to communicate data is provided by the use of a cellular device to monitor electricity usage. By connecting a modified radiotelephone transceiver to an electrical meter, data generated by that meter can be collected by a monitoring device and communicated, via the control channel, to a central data collection system by the transceiver. An interface between the monitor and the transceiver can convert the data to a format that is communicable by the transceiver. This combination, or monolithic integration, of a transceiver, monitor, and interface operates as a data reporting device. The central data collection system can cause to be placed, a page, via the FOCC, to the data reporting device in order to trigger a communication of the collected data. The data reporting device can respond by transmitting a message (i.e., an autonomous registration message or a call origination message), via the RECC, for delivery to the central data collection system. Instead of sending data for completing the registration or origination procedure, however, the data reporting device can replace such data with the collected data. Thus, no voice channel connection is established, but the collected data is, nonetheless, communicated to the central data collection system.

Another example is that of the long-haul truck. Long-haul trucking companies have a desire to monitor various aspects of trucks that are in transit and are scattered all over the country. By placing a mobile data reporting device on the truck, trailer, or container, this data can be collected and communicated back to a central data collection system. For example, a truck may be equipped with a Global Positioning System sensor that generates the coordinates of the truck's location. By sending that data back to the data collection system, the long-haul trucking company could keep track of the truck's movements at all times.

Similarly, the data could include the current temperature of a refrigerated compartment, the number of containers aboard the truck, or the speed of travel. However, unlike the electrical meter data reporting device, the mobile data reporting device may travel between CMR system cells and between CMR systems.

Thus, the data collection system will need to be told in which CMR system the long-haul truck resides, so that the data collection system can communicate with the mobile data reporting device in the forward direction, via the FOCC.

This mobile data reporting device can communicate with the data collection system in the reverse direction, as can any radiotelephone in a "foreign" CMR system, via the RECC. The data collection system described in U.S. Pat. No. 5,546,444 does not readily accommodate mobile data reporting devices, in that it does not inform the data collection system as to the location of a mobile data reporting device that has left a particular CMR system. In order for the data collection system to communicate in the forward direction to a mobile data reporting device in a foreign CMR system, it would have to send out a page in multiple CMR systems. This is an expensive and ineffectual means of establishing such communications, because it would result in an overuse of the forward direction control channels of the CMR systems' cells.

Typically, CMR systems require a radiotelephone to transmit an "autonomous registration signal" when the radiotelephone enters a foreign CMR system from another CMR system. A radiotelephone typically determines whether it has entered the coverage area of a foreign CMR system by comparing a SID assigned to the radiotelephone's home CMR system to the SID most recently received. Conventional CMR systems transmit a control message containing a SID over the FOCC. If the assigned SID is different from the SID most recently received, then the radiotelephone determines that it has moved into a foreign CMR system. However, some CMR systems do not transmit a SID different than that generated by adjacent CMR systems. In such a case, the radiotelephone is cannot determine that it needs to transmit the autonomous registration signal and roaming is not enabled. A radiotelephone that is within the coverage area of such a CMR system is "lost" to the radiotelephone's home CMR system and cannot receive incoming calls without flooding the FOCCs of multiple CMR systems with a page to initiate contact with the radiotelephone.

For the remote data reporting device, such as the electrical meter monitoring example, this does not present a problem, because the monitor never changes location, and the "home" CMR system knows where the remote data reporting device can be located, should communication in the forward direction be required. However, many applications of such data collection systems require the ability to communicate in the forward direction (i.e., from the data collection system to the data reporting device). To do so, the central data collection entity must know in which CMR system the data reporting device resides. Without this information, the central data collection entity would have to request a page in all CMR systems in order to locate the data collection device, which would result in an overuse of the forward direction control channels of the CMR systems.

There is another problem with collecting data from mobile data reporting devices that the data collection system described in U.S. Pat. No. 5,546,444 does not accommodate. The problem occurs because not every CMR system is equipped to support a data collection system. Where a data collection system incorporates a mobile data reporting device, the mobile data reporting device may, on occasion, roam into a CMR system's coverage area where the CMR system is not equipped to cooperate with the data collection system. Until the mobile data reporting device roams into a CMR system that is so equipped, it will be lost to the home CMR system and data communication will be impossible.

Accordingly, there is a need to overcome the limitations of the prior art by adapting an existing communications network to communicate data between a central location and numerous mobile data reporting devices in both forward and reverse directions. There is also a need to configure the mobile data reporting devices such that they are capable of communicating data to the central data collection system despite being within the coverage area where one of the CMR systems is not equipped to accommodate data communication. This new use of an existing communications system should have a minimum impact upon present communications carried by the CMR system. The present invention adapts the existing architecture of a CMR system in an efficient and cost-effective manner to support data communications via the CMR system, including the collection and reporting of data recorded by mobile data reporting devices that travel between CMR systems.

SUMMARY OF THE INVENTION

The present invention solves the problems of the prior art by communicating data from mobile data reporting devices via a cellular network control channel of a cellular mobile radiotelephone (CMR) system. Telecommunications service suppliers, including a company related to the assignee of this application, BellSouth Mobility, have already installed the necessary equipment to support nationwide communications via CMR networks. The inventors have recognized that the CMR system is an existing communications architecture which can be adapted in a novel manner to supply either one or two-way data communications with minimal impact upon the well known voice communications offered by the cellular mobile radiotelephone network. The present invention takes advantage of this installed base of communication equipment by using the control channel of the CMR system for data communications between a central location and numerous data sources. In this manner, the present invention conserves the valuable frequency spectrum allocated for the voice channels that support normal telephone conversations on the CMR system.

Briefly described, the present invention is a data message system for communicating data collected from data sources. The data message system includes sets of mobile data reporting devices, at least one mobile switching center (MSC) of a CMR system, and a data collection system connected to the MSC. Each mobile data reporting device includes a monitor and a mobile cellular communications device, or combination thereof, including a monolithic integration. The monitor, which is connected to a data source, monitors the operation of the data source to obtain selected data. The mobile cellular communications device is connected to a corresponding monitor and, in response to selected data, transmits a data message containing the selected data within a signal formatted as an autonomous registration signal or a call origination signal. The MSC receives data messages via a cellular network control channel of the CMR system from the mobile cellular communications devices operating within coverage areas of the CMR system. In turn, the MSC sends the data messages to the data collection system via a first communications link. The data collection system, which is typically connected to a memory storage device, can store each data message and thereafter process the stored data messages. The data collection system can accept data communications that are compatible with EIA/TIA Interim Standard 41 (IS-41) or any other industry standard or vendor proprietary protocol.

The data collection system also can transmit the stored data message to a data processing system via a second communications link. The data processing system, which also operates to store and/or process the contents of the data message, is typically located at a site remote from the data collection system. This permits processing of selected data at a central location that is more convenient for the user, rather than conducting such operations at the location for the data collection system. Although the data collection system and the data processing system are typically located at separate sites, the operations of the data collection and the data processing system also can be combined or otherwise integrated by installing those systems at the same physical location.

By use of the present invention, selected data acquired from various data sources and different locations can be communicated to a single location. The data sources typically include long-haul truck tracking, asset tracking, and mobile alarms or distress signaling. However, the data source might also be a stationary data source from which selected data is collected by means of a mobile data reporting device. For example, a mobile data reporting device aboard a cross-country train may be utilized to report inventory data monitored from stationary warehouses along the train's track. The selected data can describe certain parameters of operation or performance by each of the data sources. For example, if the data source is a long-haul truck located in a CMR system that supports data message communication, then a trucking company can obtain data, such as the truck's location at a particular time, recorded by a monitor connected to the mobile source and communicated via the control channel of the CMR system.

The MSC is also capable of transmitting a beacon page and control messages such as a System Parameter Overhead Message (SPOM) containing a system identification number (SID). The beacon page identifies the CMR system in which the MSC operates. The mobile cellular communications device monitors the cellular network control channel for the beacon page and will generate a beacon-responsive signal when the mobile cellular communications device detects that a received beacon page is different from a previously received beacon page. This difference between beacon pages indicates that the mobile cellular communications device has traveled into a new CMR system and must notify the data collection system as to its new location. The beacon-responsive signal performs this notification function. The beacon-responsive signal may be generated in the format of an autonomous registration signal or a call origination signal (collectively, an initialization signal). Once the data collection system is notified of the mobile cellular communications device's location, the data collection system can communicate with the mobile cellular communications device. Alternatively, if the mobile cellular communications device fails to receive an anticipated beacon page, the beacon-responsive signal can also be triggered.

Received control messages can also cause the generation of a beacon-responsive signal. Because the SID contained in the control message identifies the CMR system that has transmitted the control message, the mobile cellular communications device can generate the beacon-responsive signal when a received SID differs from a previously received SID. Consequently, the data collection system is informed of the mobile cellular communications device's location and is enabled to transmit a data message to the mobile cellular communications device.

The present invention also accommodates the communication of selected data that is too large to be accommodated by the structure of a conventional call origination signal (or registration signal), in CMR systems capable of supporting data field expansion. This is accomplished by expanding the data capacity of the ESN data field of the call origination signal (or registration signal). For example, when the selected data sought to be communicated is too large for a conventional call origination signal, the present invention utilizes a triggering mechanism that alerts the data message system that the ESN data field has been expanded to accommodate a larger selected data size.

These and other objects, features, and advantages of the present invention may be more clearly understood and appreciated from a review of the following detailed description and by reference to the appended drawings and claims.

DETAILED DESCRIPTION OF EXEMPLARY EMBODIMENTS

Figure 1:
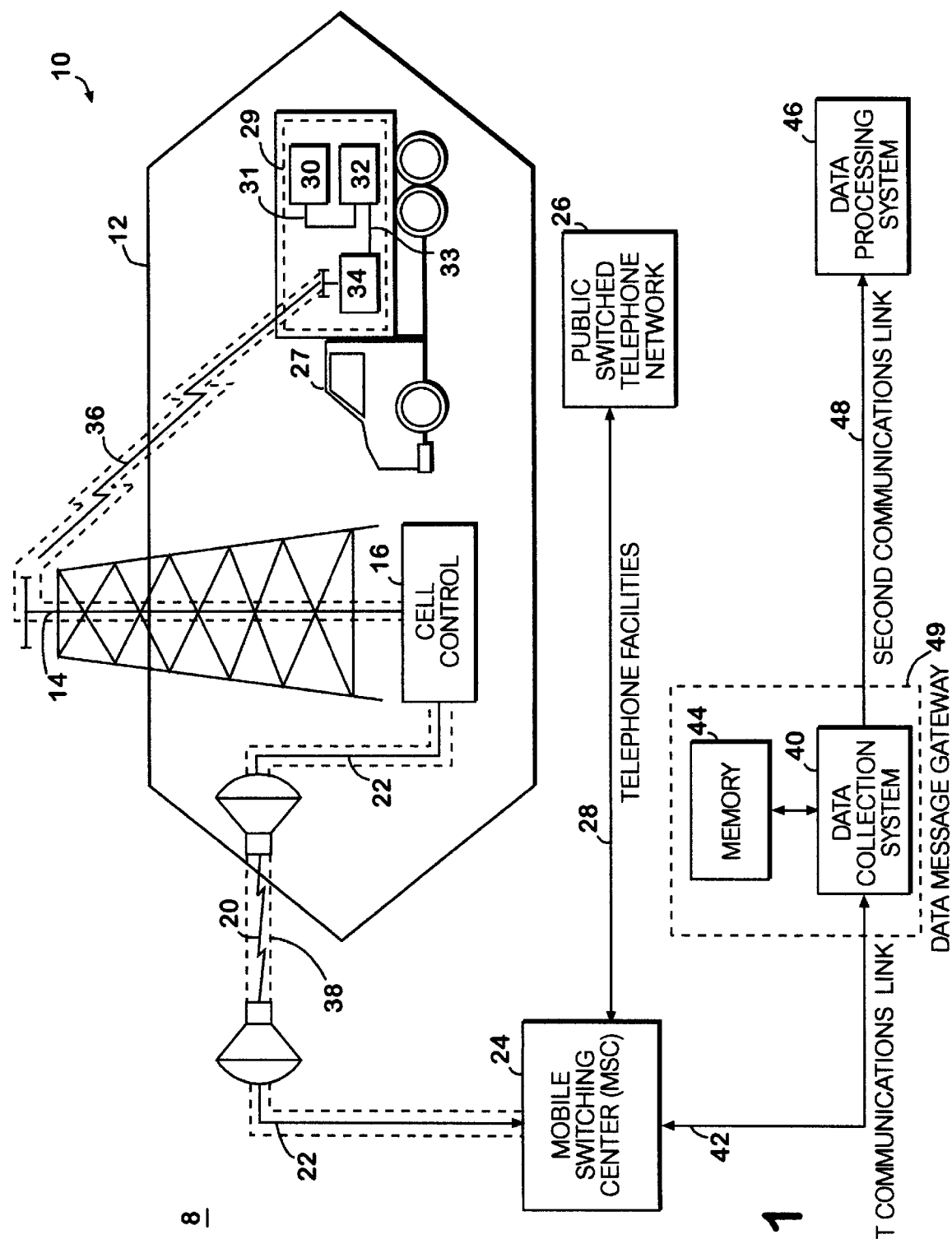
FIG. 1 is a block diagram of an exemplary embodiment of a data message system in the operating environment of a CMR system.

The present invention provides a data message system for communicating data collected from data sources. The data message system includes a set of mobile data reporting devices, at least one mobile switching center (MSC) of a cellular mobile radiotelephone system (CMR) system, and a data collection system connected to the MSC. Each mobile data reporting device monitors the operation of the data source to obtain selected data. The mobile data reporting device can transmit a data message containing the selected data to the MSC via a cellular network control channel of the CMR system. The MSC receives data messages from mobile data reporting devices operating within coverage areas of the CMR system. The MSC can send the data messages to the data collection system via a first communications link for processing of the information contained in the data messages.

By operating within the environment of a CMR system, which is well adapted for portable or mobile communications, the present invention takes advantage of an existing wide area communications network and avoids the expense of communicating with each remote data site via a dedicated conventional telephone facility or conventional two-way radios. The data message system adapts the existing environment of a CMR system to communicate data from one or more mobile units to a central location. However, to conserve the use of voice channels of the CMR system for conventional telephone conversations, the data message system uses the cellular network control channel of the CMR system for data communications. The data message is formatted to correspond to a call origination signal, which is normally transmitted by a cellular radiotelephone unit when the device originates a cellular telephone call for communication via a CMR system. Alternatively, the data message can be formatted as an autonomous registration signal, which is normally transmitted by a cellular radiotelephone unit to inform a CMR system of the radiotelephone unit's location. This permits conservation of the valuable frequency spectrum dedicated to the voice channels of the typical CMR system.

In view of the foregoing, it will be understood that the present invention adapts the existing architecture and communications protocols for a conventional CMR system to supply a novel and economical approach to the communication of data collected from numerous mobile sites. It will be further understood that the communication of data messages between an MSC and the mobile data reporting device is primarily based upon conventional techniques and known protocols for CMR system communications. Accordingly, prior to describing the embodiments of the present invention, it will be useful to first review the primary components and operation of a typical CMR system.

Cellular Mobile Radiotelephone System

A CMR system is generally characterized by dividing a radio coverage area into smaller coverage areas or "cells" using low power transmitters and coverage-restricted receivers. As will be known to those skilled in the art, the limited coverage area allows the radio channels used in one cell to be reused in another cell. As a mobile radiotelephone within one cell moves across the boundary of the cell and into an adjacent cell, control circuitry associated with the cells detects that the signal strength of the mobile radiotelephone in the just-entered cell is stronger, and communications with the mobile radiotelephone are "handed-off" to the just-entered cell.

A CMR system typically uses a pair of radio frequencies for each radio channel and each cell. Each cell typically includes at least one signaling channel, also referred to as a cellular network control channel or an access channel, and several voice channels. The control channel is selected or dedicated to receive requests for service from mobiles and portables, to convey orders to selected mobiles or portables (e.g., notification of an incoming call "page"), and to instruct the mobiles or portables to tune to a predetermined voice channel where a conversation may take place. Accordingly, the control channel is normally responsible for receiving and transmitting data to control the communication actions of the mobile and portable radiotelephones.

The control channel normally comprises a Forward Control Channel (FOCC) for communications from the MSC to a radiotelephone unit and a Reverse Control Channel (RECC) for communications from a radiotelephone unit to the MSC. The FOCC supplies a multiplexed data stream of message data words and busy idle bits. The busy idle bits are useful for supplying an indication to monitoring radiotelephones about the current status of the RECC. If the RECC is in use by a radiotelephone unit, then the RECC is considered to be busy and the busy idle bit is set to a binary one value. Alternatively, if the RECC is not in use, then the RECC is considered to be idle and the busy idle bit is set to binary zero value. Mobile radiotelephones monitor the busy idle bits transmitted by the FOCC and, if the busy idle bit is set to a binary one value, then the mobile radiotelephone delays transmission on the RECC until the busy idle bit is set to a binary zero value. Thus, a radiotelephone normally transmits on the control channel during the window of opportunity that is presented by a transition from the busy state to the idle state. In particular, the busy idle bit supplies an instantaneous view of the signaling activity on the control channel, and a conventional radiotelephone is responsive to this instant snapshot of control channel activity. Generally, a radiotelephone will monitor the FOCC which transmits Mobile Station Control Messages (hereinafter, control messages) including information such as the CMR system's System Parameter Overhead Message (SPOM) and the Global Action Overhead Message (GAOM).

The data message and radio channel specifications for U.S. cellular radiotelephone systems are set forth in Electronic Industries Association/Telecommunications Industry Association (EIA/TIA) Standard 553, implemented in accordance with 47 C.F.R. § 22, in the Report and Orders pertaining to Federal Communications Commission (FCC) Docket No. 79-318. Copies of the EIA/TIA-553 may be obtained from the Engineering Department of the Electronic Industries Association at 2001 Pennsylvania Avenue, N.W., Washington, D.C., USA 20006.

It is known that when a cellular mobile radiotelephone originates a call, it transmits at least one data message to the serving cell of the CMR system. This request for a cellular voice channel, commonly referred to as a Call Origination function, is defined by EIA/IA-553 and can be implemented as a message or signal having certain defined fields. For example, this call origination message can contain data fields for the low order seven digits of the unit's Mobile Identification Number (MIN), the unit's Station Class Mark (SCM), which identifies functional characteristics of the unit, and the Called Address, or dialed telephone number. Cellular system operators typically also require additional data words to be transmitted within a call origination message, including the MIN2, which is the high order three digits or NPA of the cellular unit's Mobile Identification Number, and the Electronic Serial Number (ESN).

The MIN is assigned to a particular radiotelephone unit by the cellular service provider selected by the subscriber. The MIN typically contains information unique to the CMR system operator, for example, the first three digits of the MIN ("XXX") typically correspond to an area code, the next three digits ("XXX") typically correspond to a geographic location within the area code; and the final four digits ("XXXX") identify a particular piece of equipment. The inventors contemplate the use of MINs that have no correlation with the physical location of the particular radiotelephone. Thus, the MIN is nothing more than an identifying code or characteristic of the particular radiotelephone. Similarly, the ESN is unique to each mobile cellular radiotelephone unit, and comprises a format that allows differentiation as to manufacturer and, in some cases, the model number, date of manufacture, and the like.

The call origination message is provided first to the serving cell of the CMR system, and then through a data link to a mobile telephone switching center, otherwise described as a mobile switching center (MSC). The MSC, also known as a "switch," makes voice connections between mobile radiotelephones and other telecommunications networks. At the MSC, a determination is typically made whether the radiotelephone identified by the message is an authorized user or subscriber by looking up the unit's Mobile Identification Number (MIN), serial number (ESN), and other information supplied by the message to see if there is an entry in the MSC's database corresponding to that particular telephone. If the MIN is valid and the radiotelephone is identified as a subscriber within the given cellular system, i.e., a "home" unit, the MSC compares the received ESN to a database entry to detect fraud. If these checks succeed, the cellular call is then allowed to proceed.

It is also well known that when a mobile radiotelephone first powers up or first enters a CMR system when already powered, the unit can identify itself as actively present within the system. The radiotelephone identifies itself or "registers" through a process known as autonomous registration by supplying a data packet of information similar to that of a call origination message. The autonomous registration signal, typically comprises data fields for at least a MIN, and an ESN. Unlike the autonomous registration signal, the call origination signal can include a data field containing the digits of the telephone number to be called, and a flag within a data field to distinguish this message from an autonomous registration signal. The flag may also be used as a means for conveying information to the MSC and/or CMR system.

The original design attempt of autonomous registration was to improve the efficiency of potential future call deliveries by keeping the MSC informed of the approximate location of each individual radiotelephone unit, and to reduce paging channel load by lessening the need to page all cells to find a particular cellular unit. When the MSC is thus informed, it can later "page" or attempt to ring the cellular unit only in the cell or area that it was last known to be in. Additional cells would be paged only if the initial page did not locate the particular radiotelephone. Thus, the autonomous registration function is typically implemented as messages periodically and autonomously sent from the mobile radiotelephone to the serving cell at an interval specified in data parameters previously received from the cell by the cellular unit.

A subscriber using or attempting to use his or her mobile radiotelephone in a service area outside the home service area is said to be "roaming," and he or she (and the associated mobile radiotelephone unit) is commonly referred to as a "roamer." For example, if a subscriber enters the service area of another CMR system service provider and powers on the radiotelephone, the radiotelephone will subsequently receive a control message via the control channel of the particular cell in which the telephone then resides. The control message, also known as a System Parameter Overhead Message (SPOM) identifies the CMR system in which the radiotelephone is residing by including a system identification number (SID) that is assigned to the CMR system. The radiotelephone will respond to the receipt of a foreign SID (i.e., an SID different from the radiotelephone's home CMR system's SID) by registering for operation in the foreign CMR system. In response, both the Mobile Identification Number (MIN) and the electronic serial number (ESN) for the radiotelephone unit are transmitted as identifying information back to the cell site. The cell forwards this information to a mobile switching center, which quickly ascertains whether the radiotelephone unit is a customer of the local cellular service provider or the customer of another cellular system.

As an alternative, other control messages, such as the GAOM may be equipped with other data that can be used, like a SID, as an identifying characteristic of the CMR system. For example, a typical CMR system has a clock-like signal, referred to as a REGID. The REGID is an integer value that is constantly being incremented by the CMR system. A typical CMR system will also generate a REGINCR value, which is constant, but represents a threshold increment for comparison of REGID values. Radiotelephones within the coverage area of the CMR system, monitor the control messages transmitted by the CMR system and receive the REGID and REGINCR values. By adding the REGINCR value to the REGID value, the radiotelephone calculates and stores a NEXTREG value. The NEXTREG value will determine when the radiotelephone will next register for operation in the CMR system. Specifically, when a REGID value received by the radiotelephone is greater than the NEXTREG value, then the radiotelephone will register with the CMR system.

The radiotelephone can also be triggered to register when the REGID varies drastically from a previously received REGID.

This will typically happen when the radiotelephone is moved from one CMR system to another CMR system transmitting a different REGID in a control message. Those skilled in the arts will recognize that various other means can be used to trigger a registration by the radiotelephone.

If the radiotelephone unit is a customer of another cellular service provider, the MSC will send a message packet to the home system for the particular telephone unit. This message indicates that the particular radiotelephone unit has registered in another cellular system and includes the SID and an MSC number (i.e., switch number) identifying the foreign CMR system and the related MSC, respectively. This message serves as a request for information about the validity of the number and account information for the radiotelephone unit. The home system responds by transmitting a responsive packet containing the requested information. If valid, the mobile switching center at the foreign cellular system will then add the roamer to its list of registered users and the home cellular system will add the subscriber associated with the radiotelephone unit to a list of roamers that are out of the service area and registered in another area.

When this same radiotelephone unit registers with yet another system, the database at the mobile switching center for the home system will observe that the unit has moved again and will update its list of where the roaming unit has most recently registered in a database system. In addition, it will send a message to the first foreign system informing it that the roaming unit has now moved on and registered in another system, and that the first foreign system should delete the particular unit from its list of registered roamers. In this manner, the databases at the various mobile switching centers are not cluttered with data identifying previously registered roamers as valid accounts to whom service should be provided, when these roamers may have long since left the area of service.

Data Message System

Referring now to the drawings, in which like numerals indicate like elements throughout the various figures, FIG. 1 illustrates an exemplary embodiment of a data message system 10 in an exemplary environment of a cellular mobile radiotelephone (CMR) system 8. Referring to FIG. 1, the data message system 10 supports the collection and communication of data to a central data collection site by mobile reporting systems associated with numerous data sources. A typical CMR system includes a geographic radio service area, such as indicated by the cell 12, of which a plurality of cells are typically provided in a typical cellular service operator's system. The cell 12 is served by a broadcast antenna 14 to permit communications between cellular mobile radiotelephones operating within the cell 12 and a cell control 16. A mobile telephone switching office, such as the mobile switching center (MSC) 24, can communicate with the cell either by dedicated telephone facilities (not shown) or, more frequently, by a cell-to-mobile switching center data link 22 between the cell control 16 and the MSC 24. At least a portion of the data link 22 is typically supported by a wireless communications link, such as the microwave link 20, located between the cell 12 and the MSC 24.

It is well known to those skilled in the art that a conventional CMR system comprises at least one mobile telephone switch coupled to an appropriate array of more or less identically equipped cell sites 12. The MSC 24 normally couples telephone conversations involving mobile radiotelephones operating in the cell 12 to the public switched telephone network (PSTN) 26 through telephone facilities 28.

The data collection system 10 includes one or more mobile data reporting devices 29, each comprising at least one monitor 32 for collecting data from data sources 30 and a mobile cellular communications device 34 for communicating the collected data via a control channel of the CMR system to the MSC 24. The monitor 32, which is connected to a corresponding data source 30 via a signal path 31, obtains and records selected data directed to the operation or performance characteristics of the data source 30. In turn, the mobile cellular communications device 34, which is connected to the corresponding monitor 32 via a signal path 33, prepares a data packet containing the selected data and transmits the packet as a data message. The selected data represents actual data acquired by the monitor 32 in response to monitoring the operation or performance of the data source 30. Alternatively, the selected data can represent predetermined data or a preprogrammed message that is associated with the detection of a certain event by the monitor 32 for the data source 30.

The data source 30 may be either a mobile data source to which a corresponding mobile cellular communications device 34 is attached, or a stationary data source between which the mobile cellular communications device 34 travels collecting monitored data. An example of a mobile data source is depicted in FIG. 1. Various aspects of a long-haul truck 27 are monitored by the monitor 32 and transmitted to the data collection system 40 via the mobile cellular communications device 34. The data source 30 might be a temperature gauge or a speedometer or any other device capable of producing data. Alternatively, the data source 30 could be stationary. For example, a cross-country train could transport a mobile cellular communications device 34 which was connected to a monitor that is capable of monitoring the inventory of various warehouses along the cross-country train's route. In either case, the data collection system 40 must be capable of communicating with the mobile cellular communications device 34.

The MSC 24 receives the data message, from the mobile cellular communications device 34, via a cellular network control channel 38 formed by the combination of the data link 22 and a cellular communications link 36 between the broadcast antenna 14 and the mobile cellular communications device 34. This combination of communications links is collectively referred to as the control channel. It is well known that a cellular network control channel for a conventional CMR system comprises two radio channels that are commonly described as an FOCC and an RECC. The FOCC is used for communications initiated by the MSC to a radiotelephone unit. In contrast, the RECC is used for communications from the radiotelephone to the MSC 24. The communications operations of an exemplary embodiment also use this convention for communications between the MSC 24 and the mobile cellular communications device 34. In particular, the control channel 38 comprises two separate data communications paths, an FOCC for communications initiated by the MSC 24 and an RECC for communications initiated by the mobile cellular communications devices 34 (or mobile radiotelephones operating within the cell). Accordingly, the mobile cellular communications device 34 transmits data messages via the RECC, whereas the MSC 24 transmits control messages via the FOCC. Data messages transmitted via the FOCC are referred to as forward data messages. Data messages transmitted via the RECC are referred to as reverse data messages.

In this manner, the MSC 24 can receive data messages from each of the cellular communication devices 34 operating within the coverage areas of an array of cells for the CMR system 8. Although the data messages contain selected data rather than the parameters normally contained in an actual radiotelephone control information, the MSC 24 will operate upon the data messages as if they were transmitted by a conventional cellular radiotelephone unit operating within the coverage area of the CMR system because the data messages are formatted to appear as a conventional call origination signal generated by a radiotelephone unit.

The MSC 24, in response to a data message, can conduct one or more of the following operations: store the data message for processing at a later date, process the selected data supplied by the data message, or forward the data message to a data message gateway 49, via a first communications link 42. The first communications link 42 is typically implemented as an IS-41/SS7 standard telecommunications signaling link, well known to those skilled in the art. The data message gateway includes a data collection system 40, a memory unit 44, a second communications link 48 and a data processing system 46. The data collection system 40, which is preferably connected to the memory storage device 44, collects the selected data by storing the received data messages within the memory storage device 44. Similar to the MSC 24, the data collection system 40 also can process the selected data to obtain further information concerning the operation or performance of the data sources 30. Alternatively, the data collection system 40 can send the information of the data message to a data processing system 46 via a second communications link 48. The data processing system 46 is typically remotely located from the data collection system 40 and facilitates convenient processing of the selected data at a central site. The second communications link 48 is typically implemented by a conventional telephone facility, a dedicated data link (e.g., Internet, Intranet), or by a wireless communications link. The data collection system 40 and the memory storage device 44 are collectively referred to as the data message system gateway 49.

The inventors foresee numerous communications applications for the data collection system 10, including communicating data collected from a wide variety of data sources, such as long-haul truck tracking, asset tracking, and mobile alarms or distress signaling.

A typical application for the data collection system 10 is to monitor various aspects of the long-haul truck 27 and to communicate positioning or other monitored data to a central site for processing. The trucking industry has a desire to track long-haul trucks using mobile cellular communications devices. This application would permit a trucking company to locate and/or monitor any one of their long-haul trucks scattered throughout a large geographic region, such as North America.

For this application, the monitor 32 could operate as a Global Positioning System (GPS) recorder to obtain the positioning data from the data source 30. The mobile cellular communications device 34 thereafter transmits a data message containing the positioning data to the MSC 24. The MSC 24 can then forward the data message to the data collection system 40 for processing of the positioning data and, in turn, the data collection system 40 sends the data message to the data processing system 46 for processing operations. In this manner, the trucking company can collect positioning data from numerous long-haul trucks to support the trucking company's tracking program.

It will be recognized that the data collection system 10 is useful for a wide variety of data collection and reporting activities and that the above-described example is not intended to limit the scope of applications for the present invention.

The Data Message

The general details of the data message format are disclosed in U.S. Pat. No. 5,546,444 issued to Peter O. Roach, Jr., Edward I. Comer, Charles M. Link, II, and Maurice Laster and assigned to BellSouth Corporation. A further discussion of the data message format in which the call origination format is utilized is disclosed in a copending U.S. patent application of Edward I. Comer and Peter Roach, Jr., Ser. No. 08/622,438, filed Mar. 26, 1996, and assigned to BellSouth Corporation. Both are incorporated herein by reference.

Figure 2A:
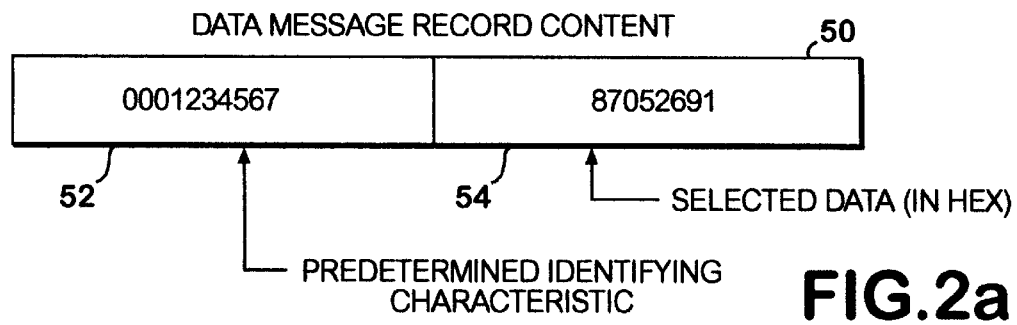
FIGS. 2a, 2b, 2c, and 2d are tables that show alternative formats for a data message communicated via the data message system shown in FIG. 1.

FIG. 2a is a table that shows the format for the data message that is communicated by the data message system 10. Referring now to FIGS. 1 and 2a, a data record 50 for the data message contains both a data field 54 for the selected data acquired from the data source 30 and a data field 52 for a predetermined identifying characteristic which uniquely identifies the mobile cellular communications device 34 that initiates the transmission of the data message. The data fields can be separated by one or more selected characters to distinguish the data fields. To take advantage of the existing architecture of a CMR system 8, the format for the data message preferably is identical to the message format (or data record) for a conventional call origination signal that is transmitted by a cellular radiotelephone when it originates a cellular call for communication via a CMR system, such as the CMR system 8. Alternatively, the data message can be formatted as an autonomous registration signal, which has a very similar format to the call origination signal, as is discussed in more detail below. For simplicity, the data message will be described below in either the format of a call origination signal or an autonomous registration signal, rather than both. In addition, both signal formats will be referred to collectively as an initialization signal. However, it will be appreciated by those skilled in the art that the autonomous registration signal and the call origination signal are both signals generated by a radiotelephone and can be both utilized as formats for data messages.

By using the data message format associated with a call origination message, the mobile cellular communications device 34 can mimic the initiation of a cellular telephone call by sending a data message that appears to contain a valid Mobile Identification Number (MIN) and an ESN. Although it is not intended for the mobile cellular communications device 34 to place a conventional voiced-based cellular telephone call, the mobile cellular communications device 34 imitates a conventional cellular radiotelephone device by generating the call origination-formatted signal, thereby enabling a data communication of selected data to the MSC 24.

As shown in the data record 50 in FIG. 2*a*, the message format for a conventional call origination signal has been adapted by the data message to permit the identification of the particular transmitting mobile cellular communications device 34 and the communication of the selected data. In particular, the data field 52 for the predetermined identifying characteristic corresponds to at least a portion of a Mobile Identification Number (MIN) assigned to the mobile cellular communications device 34. Thus, the predetermined identifying characteristic is substituted within the data field normally reserved for the MIN in the call origination signal. This predetermined identifying characteristic can belong to a set of unassigned MINs. Alternatively, the predetermined identifying characteristic assigned to each mobile cellular communications device 34 can be a conventional telephone number or a set of 10 digits. The predetermined identifying characteristic permits the identification of the source of the data by uniquely identifying the mobile cellular communications device 34 associated with the data source 30. The predetermined identifying characteristic also supplies information used by the MSC 24 to recognize that the data message containing this predetermined identifying characteristic is associated with the data collection system 40.

Furthermore, the data field 54 in the data message for remote data corresponds to the location within the data record of a call origination signal for the ESN. Those skilled in the art will appreciate that a conventional ESN data field is 32 bits long and includes 8 bits for a manufacturer code. For cellular systems that do not review or screen ESNs based upon the manufacturer code segment, it is possible to manipulate the data field normally filled by an ESN to supply a data message having a data field 54 containing 32 bits of selected data. However, if the cellular system uses the manufacturer code segment of the ESN, the selected data within the data field 54 comprises a length defined by the remaining 24 bits of the ESN. For most applications, it will not be necessary to manipulate the manufacturer's code segment of the ESN because a data message having 24 bits of selected data (and, as required, 8 bits of the manufacturer code segment for a conventional ESN) should be sufficient to supply relevant data. As an option, a Called Address Field (not shown), which normally contains the digits for the called party's telephone number, can be used for the placement of selected data within the data message.

Although adapting certain predefined data fields of a conventional call origination signal is an exemplary method for forwarding selected data in a data message to the MSC 24, the message protocol for a registration signal associated with the autonomous registration function also can be used to send desired information from the mobile cellular communications device 34 to the MSC 24 via the control channel 38. The call origination signal is substantially similar to the signal for the autonomous registration function, with the exception that the call origination signal includes the Called Address Field and a flag to distinguish it from the autonomous registration function. This flag permits the CMR system to determine whether a call origination function or a registration function should be conducted in response to a reception of these signals. The flag may also be used to convey any other type of information to the CMR system.

Alternatively, an expandable ESN data field can also be utilized by the data message system 10. To enable the use of expandable ESN data fields, the data message formatted as either a call origination signal or an autonomous registration signal may contain a predetermined triggering mechanism, indicating that the ESN data field contained in the data message is an expandable ESN data field. In response to the triggering mechanism, the data collection system 40 will be alerted that the ESN data field contains more data than that defined by the EIA/TIA Standard 553 protocol. The data collection system 40 will then look to another portion of the call origination signal or autonomous registration signal for the additional data. An "expandable ESN data field", therefore, includes a conventional ESN data field as well as one or more additional data fields, such as the ESN2 data field described below.

The triggering mechanism may be implemented in various ways. A first method is to include an ESN flag bit in the call origination signal or autonomous registration signal data packet. For example, if the ESN flag bit is set to a binary one value, then the data collection system 40 will be alerted to "look for" the additional data in another portion of the data packet. If, on the other hand, the ESN flag bit is set to a binary zero value, then the data collection system 40 will not look for additional data, and will merely process the data within the standard data packet.

Figure 2B:
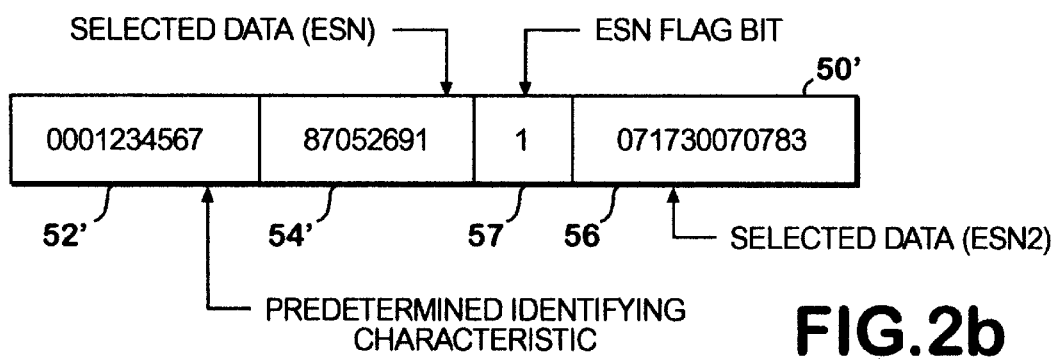

An example of the ESN flag bit implementation is depicted in FIG. 2*b*. An expandable data record 50' may include four data fields. Like a conventional data record 50, the expandable data record 50' includes data fields 52' and 54' corresponding to the MIN and the ESN of a conventional call origination signal. However, the expandable data record 50' may also include two additional fields: an ESN2 data field 56 and an ESN flag bit data field 57.

The ESN flag bit field 57 includes a flag bit that can be used as the triggering mechanism, indicating to the data collection system 40 that the data record 50' includes a data field in addition to the ESN data field 54', namely, the ESN2 data field 56. The selected data may, therefore, be contained within the ESN data field 54' as well as the ESN2 data field 56.

A second method of alerting the data collection system 40 to "look for" an expandable ESN data field is to allocate one or more predetermined data patterns as "reserved" data patterns. These reserved data patterns would not be used for any purpose other than to alert the data collection system 40 that the data message formatted as a call origination signal or an autonomous registration signal includes an expandable ESN data field. Where the selected data within the ESN data field comprises a predetermined data pattern, the data collection system 40 will be alerted to "look for" the additional data in another portion of the data packet.

Figure 2C:
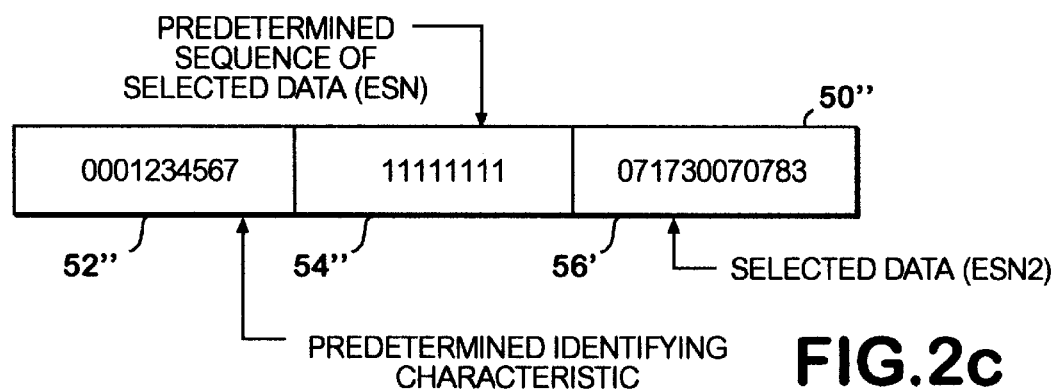

An example of this predetermined data pattern implementation is depicted in FIG. 2c. An expandable data record 50" may include three data fields. Like a conventional data record 50, the expandable data record 50" includes data fields 52" and 54" corresponding to the MIN and the ESN of a conventional call origination signal. However, the expandable data record 50" may also include an additional field, an ESN2 data field 56'.

The ESN data field 54" may contain a predetermined data pattern and thereby be used as the triggering mechanism, indicating to the data collection system 40 that the data record 50" includes a data field in addition to the ESN data field 54", namely, the ESN2 data field 56'. The selected data may, therefore, be contained within the ESN data field 54" as well as the ESN2 data field 56'.

Figure 2D:
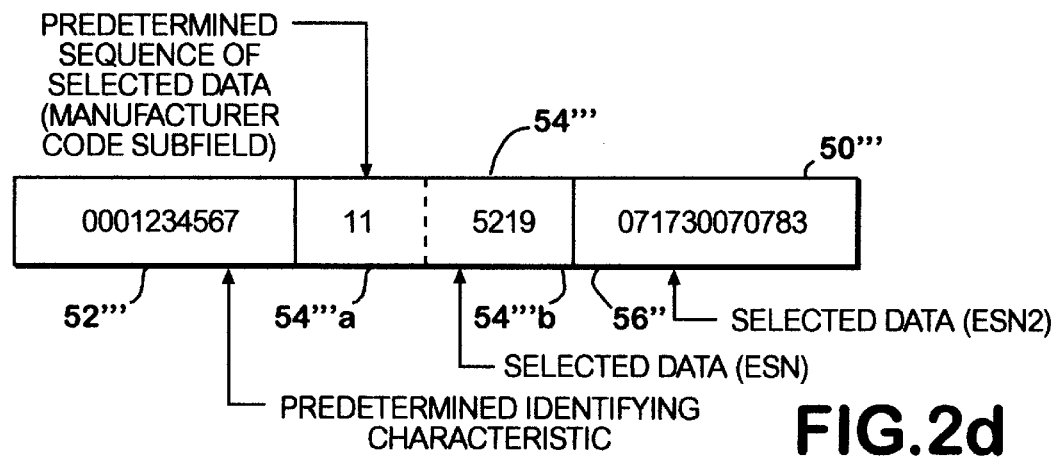

Another example of the predetermined data pattern triggering mechanism is shown in FIG. 2d. In this embodiment, only a portion of the ESN data field is used to contain the predetermined sequence of selected data. As discussed above, in connection with FIG. 2a, a conventional ESN data field includes a data subfield commonly used for a manufacturer code. The manufacturer code subfield 54'''a is an example of a subfield within the ESN which can be utilized to contain the triggering predetermined sequence. This allows the remaining portion of the ESN data field 54'''b to be utilized to contain selected data. This implementation of the ESN data field 54''' permits the transmission of more selected data than would be possible if only the predetermined sequence of selected data filled the entire ESN data field 54'''.

Like the expandable data record 50", the data record 50''' of FIG. 2d includes data fields 52''' and 54''' corresponding to the MIN and the ESN of a conventional call origination signal. The expandable data record 50''' also utilizes the manufacturer code subfield to indicate the existence of the additional field, the ESN2 data field 56'.

Just as with the ESN data field of a conventional call origination signal or autonomous registration signal, the signal incorporating the expandable ESN data field has been adapted for use as a data message to permit the identification of the particular transmitting mobile cellular communications device 34 and the communication of more selected data than permitted by a conventional call origination signal or autonomous registration signal. In particular, the data fields for the predetermined identifying characteristic correspond to at least a portion of a MIN assigned to the mobile cellular communications device 34. Thus, the predetermined identifying characteristic is substituted within the data field normally reserved for the MIN in the call origination signal or autonomous registration signal. Likewise, the selected data corresponds to at least a portion of the ESN and ESN2 data fields. The selected data is substituted within these data fields to the extent that the CMR system can operate effectively without actual electronic serial number data.

It will be appreciated that this expandable ESN data field concept may be repeated to obtain further extension of the capacity of a data message. For example, a predetermined data pattern within the ESN data field may indicate that additional selected data may be available in another portion of the data message. That additional selected data may, in turn, contain a predetermined bit pattern indicating that still more data is available in yet another portion of the data message.

As an alternative example, a variety of predetermined bit patterns may be utilized to indicate different data message sizes. For example, one predetermined bit pattern may indicate that the ESN data field is expandable to 64 bits, while another predetermined bit pattern indicates that the ESN data field is expandable to 128 bits. Because the data message is formatted as a conventional call origination signal or autonomous registration signal, the architecture of existing CMR systems can communicate the data message despite the fact that it contains an expandable ESN data field.

Communicating Data Messages from a Mobile Data Reporting Device to a Data Collection System In view of the foregoing general information about cellular system operations and the data message format, and referring to FIG. 1, in response to the transmission of a data message by a mobile cellular communications device 34, the MSC 24 typically makes a determination whether the mobile cellular communications device 34 that transmitted the data message is an authorized user or subscriber of the services offered by the cellular system 8 or another system. As shown in FIG. 2a, the data message, formatted as a call origination signal associated with the Call Origination function, preferably includes certain information that identifies the mobile cellular communications device 34 as a radiotelephone unit which normally operates within a certain remote or "foreign" cellular system. Based upon this information, the MSC 24 decides that the mobile cellular communications device 34 is a roamer because it appears to subscribe to the cellular service offered by another cellular system, which, in this case, is the data collection system 40.

The MSC 24 can maintain a list or database having entries corresponding to the identification information in the data message. At least a portion of the identification information identifies the source of the call origination signal as belonging to a particular cellular system. By checking this database, the MSC 24 determines whether the mobile cellular communications device 34 is a subscriber or a roamer. A subscriber is typically listed as an entry in the database, whereas a roamer is generally not initially listed in the database. Thus, it will be understood that the MSC 24 interprets the data message as a transmission from a roaming mobile radiotelephone operating within the CMR system 8 because the database fails to contain an entry identifying the cellular source as a "home" unit.

The remote cellular system identified by the data message is preferably dedicated to data collection applications, rather than conventional voice communications, and is represented by the data collection system 40. This remote cellular system represents the home location register (HLR) for the cellular service responsible for transmission of the data message. In recognition that the mobile cellular communications device 34 is actually associated with the remote cellular system, the MSC 24 forwards the data message to the data collection system 40 via the first communications link 42.

The data collection system 40 has now received the data message containing selected data collected from the data source 30 and, unlike the MSC 24, recognizes that the data message actually contains the desired data transmitted by a mobile cellular communications device 34. Accordingly, the data collection system 40 transmits a message to the MSC 24 that instructs the MSC to delete the cellular communication device 34 from its list of registered roamers. It will be understood that the MSC 24 would normally receive this type of message when a roaming radiotelephone has moved to another cellular system and subsequently registered for operation on that other system. Thus, the database of the MSC 24 is no longer required to maintain the registration information concerning the mobile cellular communications device 34 after transferring the data message to the data collection system 40.

Alternatively, the data collection system 40 can respond to the data message by transmitting a message which confirms that the roamer is a valid user and further instructs the MSC 24 to delete the registration entry upon the expiration of the certain time interval. As a separate option, the MSC 24 can automatically delete a registration entry from the MSC database upon expiration of a certain time period without any instruction from the data collection system 40. In this manner, the data collection system 40 is not required to send yet another message to the MSC 24 after the data collection system 40 confirms that the mobile cellular communications device 34 represents a valid user.

The MSC 24 and the data collection system 40 are preferably compatible with the EIA/TIA Interim Standard 41 (IS-41 standard). The IS-41 standard defines a communications protocol for communications between two cellular systems. The IS-41 standard allows cellular calls to be handed-off between dissimilar cellular systems, not unlike the way that calls are handed-off between cells of a single CMR system. In addition, the IS-41 standard permits call deliveries and a communications exchange for verifying whether a cellular caller is a valid cellular service subscriber. In this manner, the MSC 24 hands-off or forwards the data message to the data collection system 40 via the first communications link 42, which is preferably implemented as an IS-41-compatible network. In response, the data collection system sends a user validation message via the link 42 to confirm that the source of the data message, specifically a mobile cellular communications device 34, is a valid cellular source. Those skilled in the art will appreciate that the IS-41 standard represents but one data communications protocol that can support the implementation of an exemplary embodiment of the present invention. Other data communication protocols (besides the IS-41 standard) may be utilized to successfully implement alternative embodiments.

The data collection system 40 recognizes that the received data message contains selected data which has been transmitted by a mobile cellular communications device 34. Accordingly, the data collection system 40 processes the received data message and compares the predetermined identifying characteristic in its data message to a list of such characteristics in its database. This database preferably contains an entry of the predetermined identifying characteristic for each of the known mobile cellular communications devices 34 and corresponding data that identifies the associated device as a valid cellular source. Upon obtaining a positive match, the data collection system 40 preferably responds to the received data message by sending to the MSC 24 a validation message. The validation message confirms that the roamer associated with the data message is a valid or authorized user of the remote cellular system. However, the data collection system 40 also advises the MSC 24 to not complete the requested call because there is no need to connect the mobile cellular communications device 34 to a voice channel of the CMR system for completing a conventional voice-based telephone communication. Based on the valid user response, the mobile cellular communications device 34 is thereafter added as a registered cellular source to a database of registered roamers at the MSC 24. It will be appreciated that the data collection system 40 also can forward to the MSC 24 a message confirming the absence of a valid entry for the mobile cellular communications device 34 in response to a negative match.

This validation message can also include a profile of communications services that are authorized for use by the particular cellular source. For example, this user profile typically defines the operations limitations for the cellular source, including access to long distance services, the capability for the source to only originate (and not receive) calls via the cellular system, etc. For an exemplary embodiment, the user profile information can contain an instruction that commands the MSC 24 to delete from its database the registration entry for the particular mobile cellular communications device after the expiration of a certain time period. This allows the MSC 24 to clear from its database entries for mobile cellular communications devices 34 that have communicated data messages via the MSC 24 because such devices no longer require the continued communications support of the MSC 24. For example, these devices do not require continued support for conventional voice communications because they do not require assignment of a voice channel.

The data collection system 40 can store the selected data supplied by the received data message within the memory storage device 44, can process the selected data and store the resultant data, or can forward the selected data to the data processing system 46 for processing. Prior to sending the selected data to the data processing system 46, the data collection system 40 can convert the data message to conform to an acceptable communications protocol for conveying the data message to the data processing system 46. This step is typically required prior to communication with the data processing system 46 because, unlike the MSC 24 and the data collection system 40, neither the data processing system 46 nor the second communications link 48 may be compatible with the IS-41 standard.

Although for an exemplary embodiment the MSC 24 is programmed to treat the mobile cellular communications devices 34 as roamers associated with a foreign cellular system, it will be appreciated that the database of the MSC 24 also can be programmed to contain entries for the predetermined identifying characteristics of those mobile cellular communications devices 34 operating within the cells of the cellular system 8. Upon receiving a data message via the control channel 38 from such a device 34, an MSC 24 containing such database entries will identify the transmitting mobile cellular communications device 34 as a "home" unit rather than as a roamer because the MSC database contains an entry that corresponds to the predetermined identifying characteristic supplied by the message. Thus, the MSC 24 registers the transmitting mobile cellular communications device 34 as a home unit of the cellular system 8. This avoids the additional requirement of contacting a foreign cellular system, such as the data collection system 40, to inquire whether this cellular source is a valid user or subscriber of cellular services.

However, to initiate the necessary transfer of the information in the data message to the data collection system 40, the MSC 24 for this embodiment is adapted to recognize that data messages should still be forwarded to the data collection system 40. Specifically, based upon a portion of the predetermined identifying characteristic that is uniquely associated with the data collection system 40, the MSC 24 locates an entry in its database that commands the switch to send all messages containing such a characteristic to the data collection system 40. Accordingly, the MSC 24 thereafter forwards the data message via the first communications link 42 to the data collection system 40.

The data collection system 40 can be implemented by a computer. One embodiment for the data collection system 40 is the computer of a service circuit node. Certain manufacturers of switches, such as the MSC 24, also offer devices for implementing communications with the data collection system 40, including the Motorola EMX switch and other vendor proprietary switches. Switch manufacturers include: AT&T Network Systems, Whippany, N.J.; Ericsson Radio Systems, Richardson, Tex.; Hughes Network Systems, Germantown, Md.; and Motorola, Schaumburg, Ill.

The cellular system 8 is preferably implemented as an AMPS or a DAMPS cellular system. However, it will be appreciated that the cellular system 8 also can be compatible with alternative cellular systems implementing a control channel for mobile to cell communications, including: DCS 1800, IS 95-CDMA, JTACS, TACS, ETACS, RC 2000, NMT 450, ESMR, WACS, NMT 900, or other similar wireless systems.

It will be appreciated that the CMR system 8 includes an array of cells, such as the cell 12, and that a set of mobile reporting systems 29, each formed by the monitor 32 and the mobile cellular communications device 34, are typically located in a cell. For each data source 30 within the cell 12, the monitor 32 and the cellular communication device 34 are preferably located proximate to the data source 30 to minimize the lengths of the signal paths 31 and 33. To facilitate economical installation of the reporting device, the monitor 32 and the cellular communication device 34 can be combined within the same housing and this housing can be installed either adjacent to or as an integral part of the data source 30. For an installation proximate to the data source 30, the signal path 31 and the signal path 33 preferably form hard-wired connections between the connected devices. Nevertheless, it will be appreciated that the signal paths 31 and 33 also can be implemented as either infrared communications links or wireless communications links.

It will be understood that a single mobile cellular communications device 34 can be connected to multiple monitors 32 to permit the transmission of selected data collected from associated data sources 30 located at a central site. For example, a single mobile cellular communications device 34 can be mounted at a central location within or along an office building and multiple monitors 32 can be distributed throughout the building to permit the acquisition of data from the associated data sources 30.

The data collection system 40 can be located proximate to or as an integral part of the MSC 24, in which case the first communication link 42 preferably forms a hard-wired connection between the devices. However, the data collection system 40 also can be positioned at a remote site. For this remote installation, the first communications link 42 can be implemented as a wireless communications system, such as a microwave system, or as a dedicated data line, such as a conventional telephone facility. For the convenience of the party that is sponsoring the collection of a particular type of data, the data processing system 46 is typically located at another remote site that is typically proximate to the sponsoring party.

An Exemplary Mobile Cellular Communications Device

Figure 3:
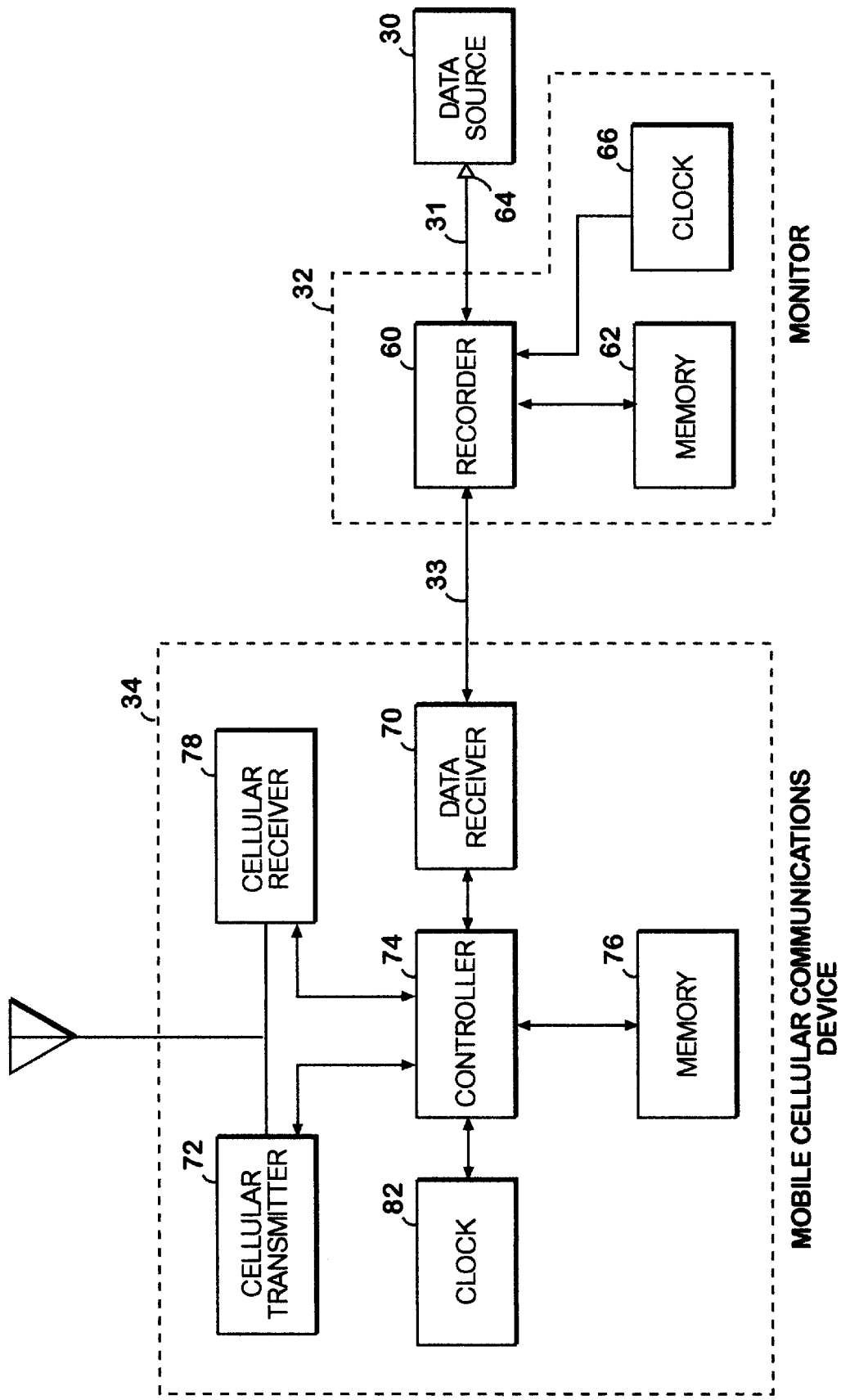
FIG. 3 is a block diagram of a mobile data reporting device for an exemplary embodiment of the data message system.

FIG. 3 is a block diagram that illustrates the components of the mobile reporting system 29, namely the monitor 32 and the mobile cellular communications device 34. Referring now to FIGS. 1 and 3, the monitor 32 includes a recorder 60, a memory 62, and one or more sensors 64. The recorder 60, which is connected to the data source 30 via the signal path 31, uses the sensors 64 to detect certain operating or performance characteristics of the data source 30. The detected characteristics represent selected data that are preferably stored within the memory storage device 62. The memory 62 is preferably random access memory (RAM). However, it will be understood that the memory 62 also can be implemented by other types of mass data storage devices, including a computer hard disk drive, an optical disk drive, or a compact disk (CD-ROM).

It will be appreciated that the signal path 31 represents one or more signal channels for transferring the selected data to the recorder 60 and, furthermore, that the recorder 60 can be implemented as either a single or multi-channel recording device. Each signal channel normally would be associated with a different operating or performance characteristic for the data source 30.

For certain applications, the recorder 60 records selected data from the data source 30 for a predetermined time period. A clock 66 connected to the recorder 60 supplies timing data to the recorder 60, thereby enabling the recorder 60 to add a time tag to the selected data. The time tag indicates the relative time for the start of each predetermined time period of recording operations. Assuming that the predetermined time period is a known value, the addition of the time tag data permits the calculation of the start and completion times for each data reporting operation. Correlation of the data collection time to the selected data is desirable for certain processing operations. The clock 66 can be implemented as a conventional counter supplied by a hardware device or as a software routine executed by a microprocessor.

The mobile cellular communications device 34 can include at least a data receiver 70, a cellular transmitter 72, and a controller 74. The data receiver 70, which is connected to the recorder 60 via the signal path 33, receives the selected data obtained from the data source 30 by the monitor 32. The controller 74, which is connected to the data receiver 70 and the cellular transmitter 72, controls the respective operations of the data receiver 70 and the cellular transmitter 72. The controller 74 is preferably a microprocessor-based control system that can be programmed to conduct control operations in a manner known to the art.

In response to the selected data, the controller 74 prepares a data packet containing the predetermined identifying characteristic associated with the cellular transmitter 72 and the selected data collected from the data source 30. The cellular transmitter 72 responds to the data packet by transmitting a corresponding data message via the control channel 38 of the CMR system 8. Specifically, the cellular transmitter 72 uses the RECC of the control channel 38 to send data messages to the MSC 24. Although the cellular transmitter 72 can be implemented as a conventional transmitter for a radiotelephone unit, an exemplary cellular transmitter 72 uses only the data radio channels of the CMR system 8 for transmission of data messages. Consequently, the cellular transmitter 72 is preferably implemented as a data transmitter capable for transmitting data messages, formatted as a call origination signal or autonomous registration signal, via the RECC of the control channel 38.

The mobile cellular communications device 34 further includes a memory storage device 76 connected via a bi-directional data path to the controller 74. The selected data received by the data receiver 70 can be stored in the memory storage device 76 prior to the transmission of a data message by the cellular transmitter 72. Although the memory storage device 76 is shown as a separate memory from the memory storage device 62, it will be appreciated that the memory storage devices 62 and 76 can be implemented as a single memory which is accessible by both the recorder 60 and the controller 74.

To receive communications from the MSC 24 via the control channel 38, the mobile cellular communications device 34 also includes a cellular receiver 78. The cellular receiver 78, which is connected to the controller 74, can be implemented as the cellular receiver for a conventional radiotelephone. However, similar to the cellular transmitter 72, an exemplary cellular receiver 78 operates to receive information primarily via the data radio channels rather than the voice radio channels of the CMR system. Indeed, an exemplary embodiment uses a cellular receiver 78 having only data communications capability to avoid the expense and weight of additional circuitry for voice-based communications.

It is well known that the FOCC of the cellular network control channel carries a stream of busy idle bits to indicate the status of the RECC of the cellular network control channel. The RECC is busy if the busy idle bit is set to a binary one value. To minimize the impact of transmissions by one or more mobile cellular communications devices 34 within the cell 12 upon the normal control signal traffic on the control channel 38, the cellular transmitter 72 preferably transmits the data message during those periods when the channel is available or is likely to be available. Accordingly, the cellular receiver 78 monitors the FOCC of the control channel 38 to enable a determination of the amount of activity on the RECC for the monitored cell. By monitoring the FOCC and counting the number of busy idle bits set to the binary one value for a predetermined time period, the mobile cellular communications device 34 can determine the level of control channel activity during that time period. If the level of control channel activity falls below a certain threshold associated with light or no activity on the control channel, then the controller 74 supplies the data packet to the cellular transmitter 72. In response, the cellular transmitter 72 initiates a data message transmission, formatted to appear as a call origination signal or autonomous registration signal, to the MSC 24 via the RECC of the control channel 38.

In particular, the mobile cellular communications device 34 preferably monitors the busy idle bits carried by the FOCC of the control channel 38 for sequential, predetermined time periods. The mobile cellular communications device 34 calculates and stores (1) a running average of the "highest" count of busy idle bits set to the binary one value per each monitoring time period, and (2) a last "n" count of busy idle bits set to the binary one value per monitoring time period. To calculate the running average, a newly acquired count of busy idle bits set to the binary one value per time period is averaged with a stored average of busy idle bits set to the binary one value if the count for the immediately preceding interval is higher than a value of one standard deviation lower than the stored average. Prior to transmitting a data message via the control channel 38, the mobile cellular communications device 34 will average the stored last "n" counts of busy idle bits set to the binary one value per time period and compare that computed "n" average to the stored running average. If the computed "n" average drops below the stored running average, then the mobile cellular communications device 34 outputs the data message. However, if the computed "n" average exceeds the stored running average, then the mobile cellular communications device 34 will delay the transmission. In contrast to conventional radiotelephone units, which are responsive to an instantaneous view of activity on the control channel, it will be appreciated that the above-described transmission queuing process is a heuristic method based upon a deterministic analysis of the stream of busy idle bits.

In this manner, the cellular transmitter 72 delays transmitting the data message to a time interval when the control channel is available for clear use by the mobile cellular communications device 34. This form of data queuing minimizes the possibility that the operation of numerous mobile cellular communications devices 34 within the cell 12 will interfere with normal telephone conversations involving the operating radiotelephones within the cell. Nevertheless, it will be appreciated that the cellular transmitter 72 also can not transmit the data message without first checking the availability of the control channel 38.

Alternatively, the mobile cellular communications device 34 can be programmed to transmit the data message during a certain time interval, such as during the early morning hours between midnight and 6 AM, when control signal traffic is normally at a minimal level. To permit this type of automated transmission operation, the mobile cellular communications device 34 includes a clock 82 connected to the controller 74. The clock 82 outputs a clock signal in response to expiration of a time interval. In response to the clock signal, the controller 74 initiates a data message transmission by the cellular transmitter 72. In this manner, selected data is transmitted during a known time interval from one of the reporting devices within the cell 12 to a central location.

The clock 82 preferably outputs the clock signal during the time period when use of the control channel 38 is at a reduced level, thereby minimizing the possibility that the mobile cellular communications device 34 will interfere with the normal communications operations of the CMR system 8. In particular, the time interval is preferably selected with advance knowledge of the reduced activity periods for conventional telephone conversation traffic on the CMR system 8 to ensure that data message transmissions by the various mobile cellular communications devices 34 in the cell 12 are conducted on a noninterference basis with voice call processing messages transmitted to and from the radiotelephones operating in the cell. The clock 82 can be implemented as either a hardware counter or as a software counter implemented by coded instructions executed by the controller 74.

A data transmission by the mobile cellular communications device 34 also can be initiated in response to a status signal output via the signal path 33 by the monitor 32. This status signal causes the mobile cellular communications device 34 to transmit the stored selected data via the RECC of the control channel 38. The stored selected data may be transmitted in whole or in smaller packets of data, depending on the application and the availability of communications resources (e.g., a low-activity period). The monitor 32 typically outputs the status signal in response to the completion of a data recording event. For example, in a typical long-haul truck application, the monitor 32 can output the status signal in response to an alarm event, such as the detection of a loss of the GPS signal. Alternatively, for an utility load management application, the monitor 32 can output the status signal in response to detection of possible tampering of the utility's load control device or after some predefined time period. Those skilled in the art will appreciate that the generation of the status signal is event-driven and that the applications for the data message system 10 will determine those events.

For the described embodiment, the mobile cellular communications device 34 responds to the clock signal or the status signal by sending a data message having a message format of a conventional call origination signal. In turn, the MSC 24 receives the data message via the control channel 38 and subsequently operates upon the data message as if it were a call origination signal transmitted by a conventional cellular radiotelephone unit.

Although the time interval for the clock 82 is preferably selected to minimize any interference from data message transmissions, it is still possible that the cellular network control channel 38 may be busy when the clock 82 outputs the clock signal to initiate a transmission by the cellular transmitter 72. To minimize this possible interference problem, the data message transmission is delayed until the mobile cellular communications device 34 detects a level of activity on the control channel 38 that is less than a certain threshold for a predetermined time period. Although this delays a data message transmission that normally would have taken place in direct response to the clock signal, the delay allows the mobile cellular communications device 34 to transmit the data message during an interval when the control channel 38 is not busy.

For this embodiment, the controller 74 responds to the clock signal output by the clock 82 by detecting the busy idle bits set to a binary one value, as carried by the FOCC and received via the cellular receiver 78, and calculating both the running average and the "n" average. This running average is stored within the memory storage device 76. The controller 74 will supply a data packet containing the selected data to the cellular transmitter 72 only when the computed "n" average drops below the stored running average. It will be appreciated that this process of queuing the transmission of data messages typically requires the storage of the selected data within the memory 76 prior to initiating the data message transmissions.

It is well recognized that a cellular network control channel, such as the control channel 38, is a two-way communications path between the MSC 24 and the radiotelephone devices operating in the cell 12. Thus, the receiver 78 is also useful for receiving communications from the MSC 24 via the FOCC of the control channel 38. In particular, the MSC 24 can output control messages via the control channel 38 to initiate certain operations or to control certain functions of one or more of the cellular communication devices 34 within the cell 12. The mobile cellular communications device 34 is preferably programmed to respond to a control message by conducting a particular operation or by controlling a certain function associated with the control message.

The control message typically include address data and each mobile cellular communications device 34 only responds to a control message containing its predetermined address data. This allows the MSC 24 to communicate with one or more of certain selected communications devices 34. By proper use of the addressing operation, it is possible for the MSC 24 to remotely control the operations or functions of a subset of the mobile cellular communications devices 34 that is selected from the overall group of devices 34 within the cell 12.

The address data of the control message is preferably a 10 digit number that represents a conventional telephone number. At least a portion of this telephone number is assigned to a corresponding mobile cellular communications device 34. The remaining portion (if available for use) of the 10-digit telephone number can represent a command for a particular operation or finction. In this manner, a mobile cellular communications device 34 can be programmed to respond only to a control message containing its address data and to conduct the particular operation or finction identified by the address data.

By transmitting control messages to the mobile cellular communications devices 34, the MSC 24 can remotely control various operations of the mobile cellular communications devices 34 or can remotely define various programmable operating parameters of the devices 34. In response to a selected control message the mobile cellular communications device 34 mimics the call origination operation of a conventional cellular radiotelephone unit by transmitting a data message formatted as a call origination signal or an autonomous registration signal to the MSC 24. By use of this control message, a selected mobile cellular communications device 34 can be polled at any time by the MSC 24 to initiate the transmission of a data message containing the desired selected data.

In response to another control message, the time interval for the clock 82 is modified or otherwise replaced with a substitute time period. The mobile cellular communications device 34 also can instruct the monitor 32 to initiate a recording of data from the data source 30 in response to yet another control message. In particular, the controller 74 responds to the detection of the control message by the cellular receiver 78 and outputs an instruction signal to the recorder 60 to prompt the data reporting operation.

An Exemplary Method for Communicating Data Messages in the Reverse Direction

Figure 4:
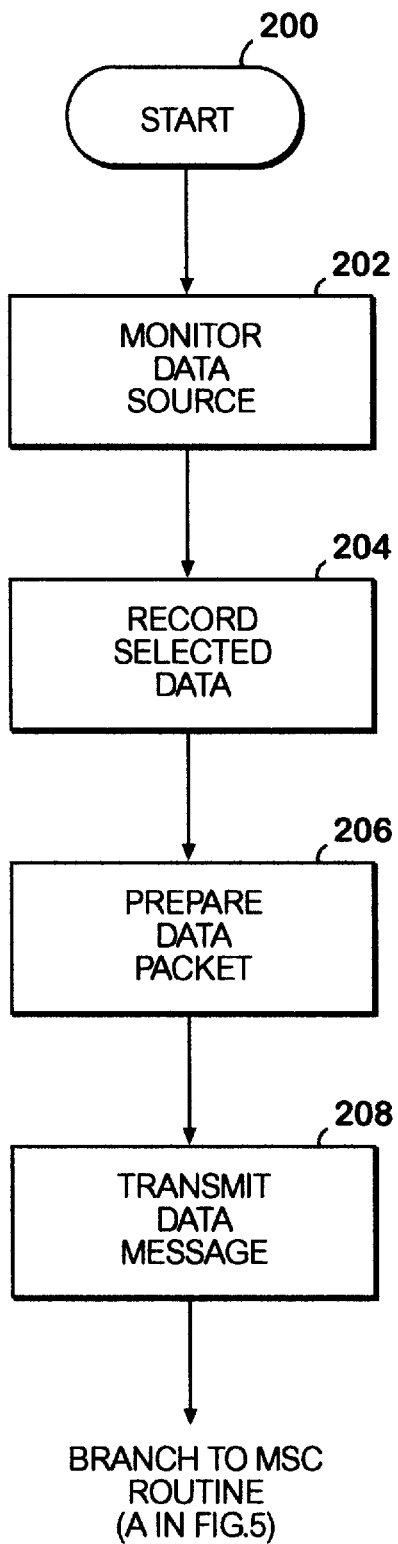
FIG. 4 is a flow chart diagram that shows the steps for a method of communicating a data message via an exemplary embodiment of the data message system.

FIG. 4 shows exemplary steps of a method for communicating data collected from data sources via a cellular network control channel of a CMR system (i.e., a reverse direction communication). With the foregoing general operation of the components of the data collection system 10 in mind, and referring now to FIGS. 1 and 4, the method starts at the start block 200. At step 202, the operation of one or more data sources 30 is monitored, typically for a predetermined time period. At the step 204, selected data directed to the operation or performance characteristics of the data source 30 are collected and stored. A data packet containing the selected data and the predetermined identifying characteristic is prepared in the step 206. At step 208, the data message corresponding to the data packet is transmitted to the MSC 24 via the control channel 38 of the CMR system 8. The above-described steps are preferably implemented by one or more software routines that are executed by the mobile reporting system 29 formed by the monitor 32 and the mobile cellular communications device 34.

Figure 5:
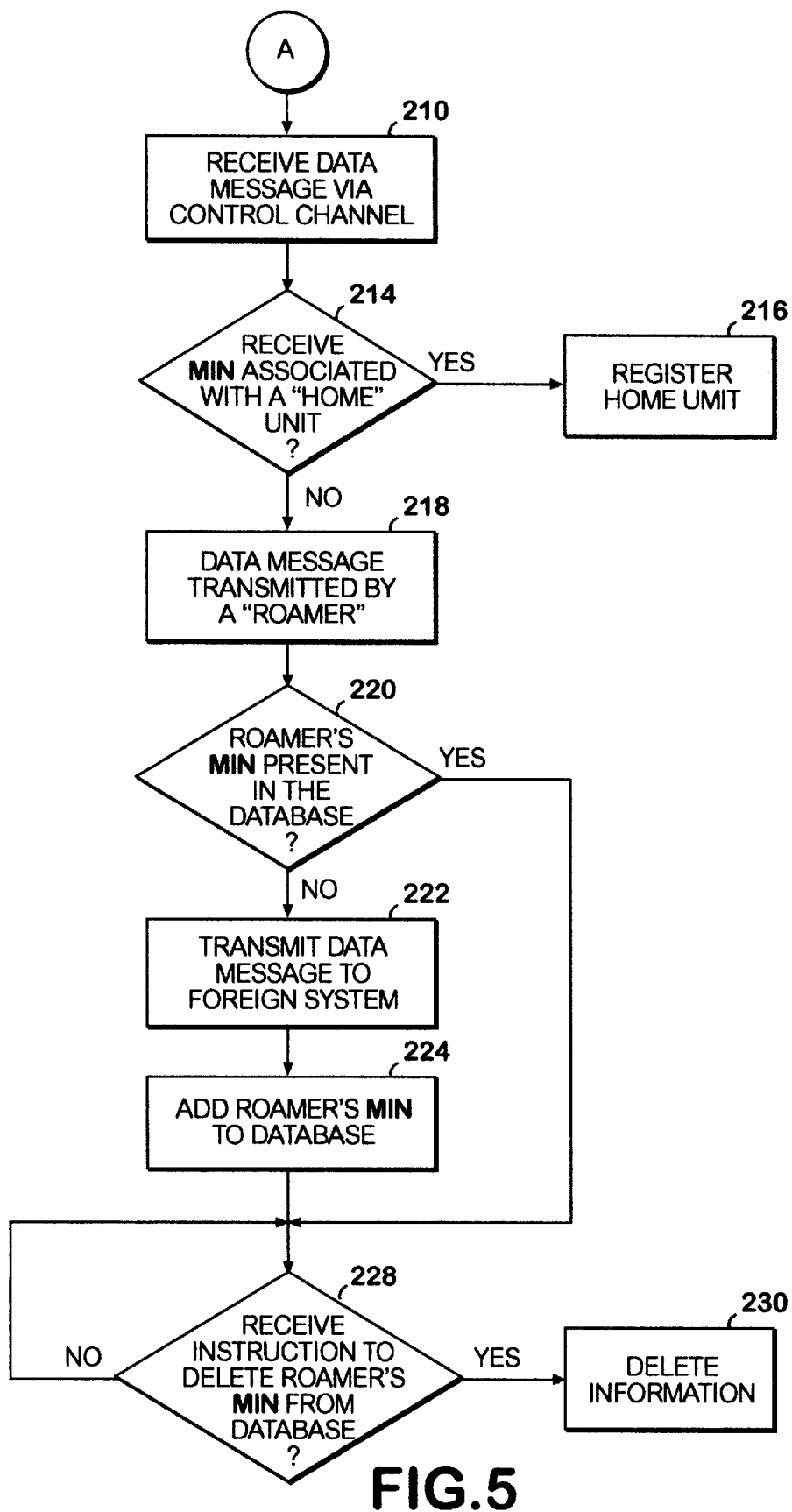
FIG. 5 is a flow chart diagram that shows the steps for a method of processing a data message by an exemplary embodiment of the data message system.

The program next branches to block A (FIG. 5). During the enablement of this program branch, the MSC 24 determines whether a cellular call origination signal has been transmitted by a roamer or by a home unit based upon the information contained in the data message which, in this case, is formatted as a call origination message. Consequently, the data message contains information placed in at least the data fields corresponding to a MIN and ESN in a conventional call origination signal. As an option, selected data can also be placed in the data field normally reserved for the telephone number of the called party.

FIG. 5 illustrates exemplary steps taken by the MSC 24 to determine whether the received data message has been transmitted by a roamer or by a home unit and the resulting actions taken by the MSC 24 based upon this initial determination. Turning now to FIGS. 1 and 5, the database operations conducted by the MSC 24 begin at step 210 of branch A. At step 210, a data message, preferably formatted as a call origination signal or an autonomous registration signal for initiating a cellular communication, is received via the control channel 38 at the MSC 24, and the data fields of the data message are examined. At decision block 214, if the data in the received MIN field represents a MIN associated with a home unit having an entry in the database of the MSC 24, then the "YES" branch is followed to block 216. In block 216, the home unit, which is a conventional cellular radiotelephone unit associated with a subscriber of the services offered by the CMR system for this MSC, is considered to be a valid user for cellular voice-based communications via with the MSC 24. It is highly likely that at least some of a conventional radiotelephones operating within the cell 12 represent subscribers to the cellular services offered by the CMR system 8 and, accordingly, those radiotelephones are typically identified as home units. In contrast, the transmissions by the mobile cellular communications devices 34 operating within the cell 12 are preferably designed to appear as transmissions from roamers associated with a foreign or remote CMR system, such as the data collection system 40.

If the data in the received MIN field does not match an entry in the database maintained by the MSC 24, then the "NO" branch is followed to step 218, where the MSC 24 determines that the source of the data message signal is a roamer. The MSC 24 makes this determination based on information within the data message in a data field corresponding to the MIN. For the data message originated by a mobile cellular communications device 34, the predetermined identifying characteristic is stored in the data field normally reserved for the MIN. At least a portion of the predetermined identifying characteristic identifies the data collection system 40 as the "home" service provider for the mobile cellular communications device 34. Thus, the MSC 24 determines that the data message has been transmitted by a roamer associated with a another CMR system, such as the data collection system 40.

At decision block 220, the database maintained by the MSC 24 is checked to determine whether the information associated with the MIN field is present. As explained in more detail below, the MSC 24 normally will not locate the predetermined identifying characteristic within this database because the data message has been transmitted by a mobile cellular communications device 34, rather than by a conventional radiotelephone unit. If this inquiry is negative, the "NO" branch is followed to block 222.

At block 222, the MSC 24 forwards certain identification information to the CMR system associated with the roamer, as identified by information obtained from the MIN data field. This CMR system is typically represented by a home location register. For example, the MSC 24 can transmit information taken from certain fields of the received data message, including the predetermined identifying characteristic and the selected data, via the first communications link 42 to the data collection system 40. At this point, the data collection system 40 recognizes that the transmitted information contains the desired selected data, and typically stores the selected data within the memory storage device 44 to facilitate subsequent uses of the selected data. In addition, the data collection system can issue a validation message to the MSC 24 via the first communications link 42. The validation message confirms that the source of the information provided by the data message is a valid user of services offered by this foreign CMR system, i.e., the data collection system 40. This validation message also preferably indicates that the MSC 24 should deny cellular voice communications privileges for this source because no voice-based call is typically associated with the data message transmitted by the responsible mobile cellular communications device 34. Alternatively, the MSC 24 may respond to the validation message by terminating a voice channel that has been already initiated. This type of validation message prevents the MSC 24 from attempting to assign a cellular voice channel for use by the source of the data message.

If the information of the MIN field is contained in the database of the MSC 24, then the steps 222 and 224 are jumped by following the "YES" branch to decision block 228.

Information concerning a roamer, such as a mobile cellular communications device 34, can be added, at least temporarily, to the database at the MSC 24 during the step 224 in response to the validation message. However, at step 228, an inquiry is conducted to determine if the MSC 24 has received an instruction from the CMR system associated with the roamer, such as the data collection system 40 which requests the deletion of the roamer information from the MSC database. If the response is positive, the "YES" branch is followed to step 230 and the MSC 24 deletes the entry from the database. In this manner, the database is not cluttered with information that is no longer relevant to the operations of the MSC 24. In contrast, if the response is negative, then the "NO" branch is followed back to the step 228.

The steps shown in FIG. 5 are preferably implemented by one or more computer software routines that reside on and are executed by the MSC 24. The software development techniques necessary to code this process and to create the necessary software routines are known by those skilled in the art.

Figure 6:
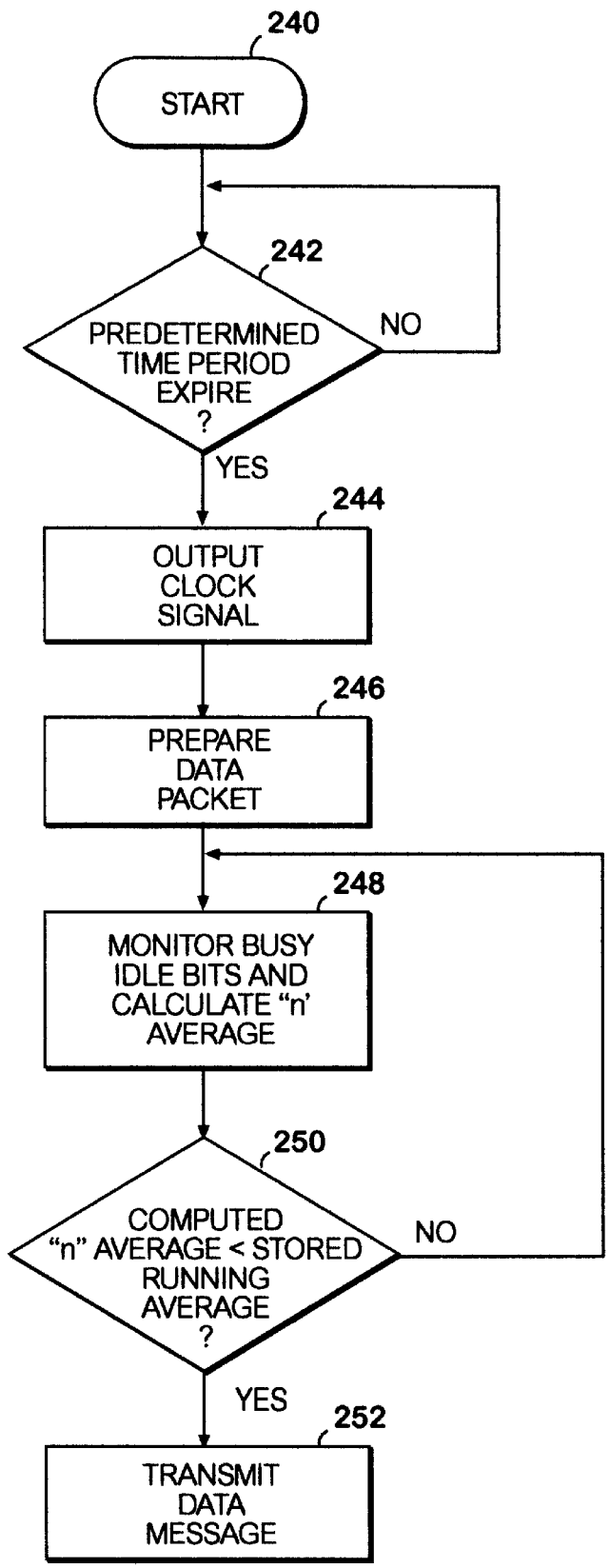
FIG. 6 is a flow chart diagram that shows the steps for a method of initiating the transmission of a data message via a mobile cellular communications device of an exemplary embodiment of the data message system.

FIG. 6 is a flow chart diagram that shows the steps for a method for initiating the transmission of a data message via a cellular network control channel of a cellular system. Referring to FIGS. 1 and 6, the method is started at the start block 240. At step 242, an inquiry is made whether a certain time interval has expired. If the time period has not expired, the "NO" branch is followed to the start block 240. In contrast, if the time period has expired, then the "YES" branch is followed to the block 244. In step 244, a clock signal is output upon the expiration of the certain time interval. A data packet is prepared in step 246 to permit the transmission of a data message containing the predetermined identifying characteristic and the selected data. At this point, the mobile cellular communications device 34 is ready to transmit the data message if a data channel of the cellular network control channel is available on a noninterference basis.

In step 248, the mobile cellular communications device 34 monitors the stream of busy idle bits carried by the FOCC of the control channel 38 and thereafter calculates the average for the last "n" busy idle bits having a binary one value per time interval. At decision block 250, an inquiry is conducted to determine whether the computed "n" average is less than the stored running average of the highest count of busy idle bits having a binary one value per time interval. If the response to this inquiry is negative, the control channel 38 is busy and, accordingly, transmission of the data message is delayed by following the "NO" branch to the step 248 and the sequence of monitoring the busy idle bits and calculating averages continues. In contrast, if the response is positive, then the "YES" branch is followed to step 252 and the data message is transmitted via the RECC of the control channel 38 to the MSC 24.

The steps shown in FIG. 6 are preferably implemented by one or more computer software routines that reside on and are executed by the mobile cellular communications device 34. The software development techniques necessary to code this process and to create the necessary software routines are known by those skilled in the art.

A Data Collection System Communicating to a Mobile Data Reporting Device

The above description is directed to the data message system that is adapted for communication from the mobile cellular communications device 34 to the data collection system 40, via the MSC 24. Such communication in the reverse direction is well handled by conventional CMR systems, because of the roaming system capabilities of most CMR systems. However, where the data collection system 40 seeks to communicate with a mobile cellular communications device 34 in the forward direction, a further modification of conventional cellular communication is required.

As described above, a cellular device that travels between CMR systems can coordinate telephone calls through its home CMR system by utilizing the roaming system that most CMR systems are equipped to accommodate. However, in order to effect communication originating with the data collection system 40 and directed toward the mobile cellular communications device 34, the data collection system 40 must know which CMR system and which cell within the CMR system to send a page identifying the mobile cellular communications device 34.

Figure 7:
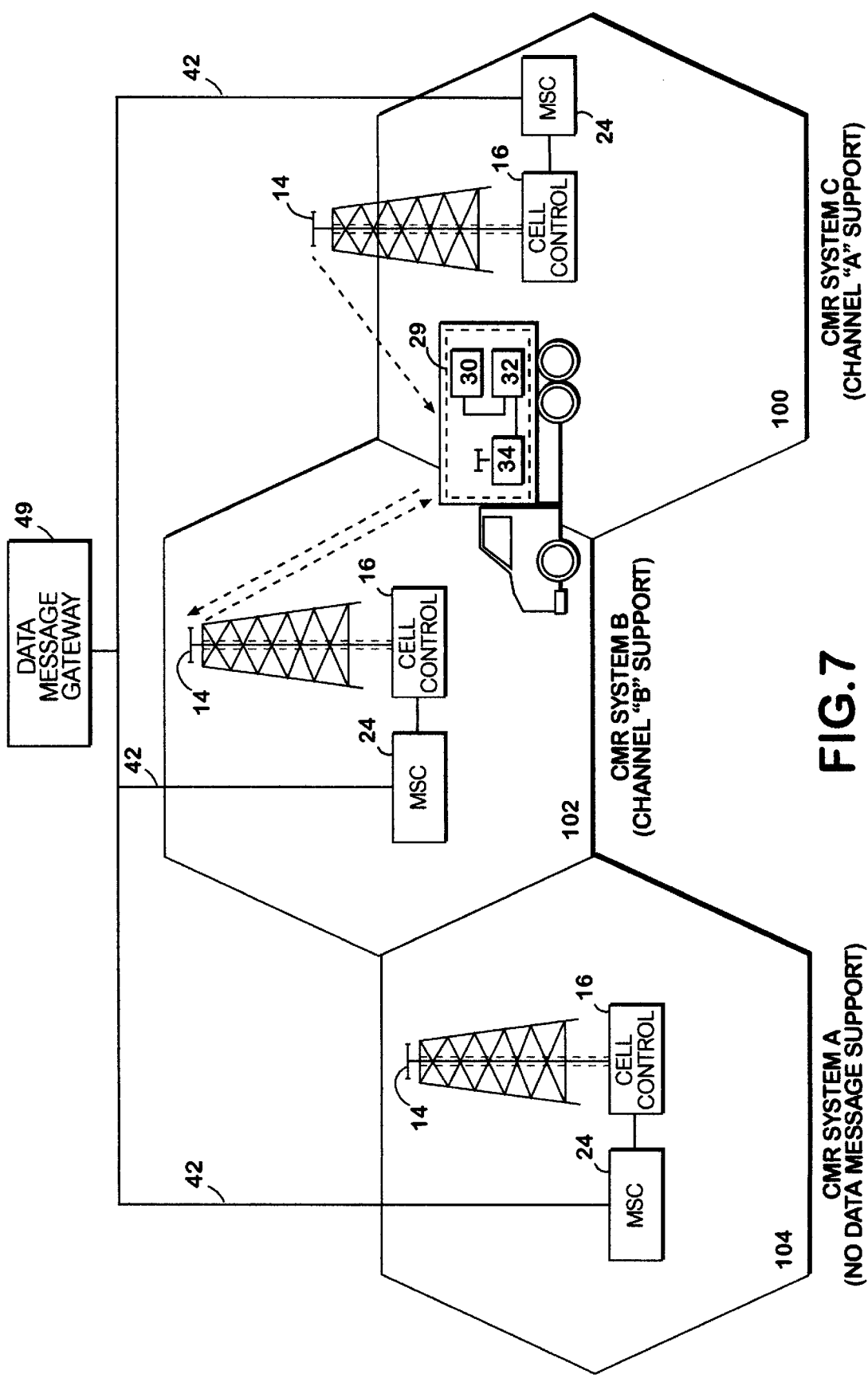
FIG. 7 is a block diagram of an exemplary embodiment of a data message system in the operating environment of a plurality of CMR systems.

FIG. 7 illustrates the movement of the mobile cellular communications device 34 between CMR systems rather than merely between CMR cells. Referring now to FIGS. 1 and 7, as the long-haul truck with the mobile data reporting device 29 aboard travels from CMR system "C" 100 to CMR system "B" 102. The mobile cellular communications device 34 will be roaming with respect to the data collection system 40 regardless of the CMR system in which it resides. However, even if the mobile cellular communications device 34 is effectively monitoring the control channels of CMR System "B" 102, it will not necessarily inform the data collection system 40 that it has changed CMR systems. Thus, the data collection system's 40 attempts at forward direction communication with the mobile cellular communications device 34 may be directed at CMR System "C" 100, or the last CMR system in which the data collection system 40 was informed of the mobile cellular communications device's 34 residence.

As is illustrated in FIGS. 1 and 7, the data message gateway 49 which includes the data collection system 40, can be functionally connected with any of a number of CMR systems, via one of the first communication links 42. However, without any information as to the location of the mobile cellular communications device 34, the data collection system 40 will not be able to efficiently communicate with the mobile cellular communications device 34 in the forward direction.

Forward direction communication is desirable, because it allows the data collection system 40 to demand a data message from a mobile cellular communications device 34 operating in a location (i.e., CMR system) known to the data collection system 40. For example, if a long-haul trucking company desired to determine the cargo capacity of a particular truck, it could do so by commanding the mobile cellular communications device 34 to collect the selected data from the monitor 32 and to transmit the data to the data collection system 40. However, if the mobile cellular communications device 34 was outside the coverage area of any known CMR system, then such a forward communication would be impossible, unless a page for the mobile cellular communications device 34 was transmitted over all CMR systems/cells by issuing a flood page. Such a flood page would be costly to the trucking company and would waste CMR system resources.

This location information can be provided by means of a beacon-responsive signal. The beacon-responsive signal is another data message that can be transmitted via the cellular network control channels of a conventional CMR system and can be formatted as a call origination signal or an autonomous registration signal (i.e., an initiation signal). While the data that can be transmitted by the beacon-responsive signal can vary as described above in connection with FIGS. 1 and 2a–2d, the primary purpose of the beacon-responsive signal is to transmit information to the data collection system 40 as to the CMR system in which the mobile cellular communications device 34 is located. The exemplary beacon-responsive signal does not include the SID or MSC switch number, but typically includes the MIN corresponding to the mobile data reporting device 34, the ESN and other data.

The MSC is responsive to the receipt of a beacon-responsive signal from a mobile data reporting device 34 to append the MSC switch number and SID before transmitting an appended beacon-responsive signal to the data collection system 40 via the first communications link 42. Thus the data collection system 40 can update its database to reflect the current CMR system in which the mobile cellular communications device 34 is located. In turn, the data collection system 40 can format the data received from the MSC for delivery to the data processing system 46. The data collection system may also forward (or make accessible) to the data processing system 46 such data including the MIN, the ESN, a date/time record, the SID, and the MSC switch number.

The locating function is similar to that function provided by the autonomous registration signal. When the data collection system 40 receives the beacon-responsive signal from the MSC, it registers the new CMR system and will transmit any forward communications intended for the mobile cellular communications device 34 to that CMR system. Additionally, if the foreign CMR system requires verification of the mobile cellular communications device's 34 validity as a subscriber of the home CMR system (i.e., the data collection system 40), the data collection system 40 will generate a responsive signal validating the mobile cellular communications device 34. As discussed above in connection with the autonomous registration signal, the data collection system 40 can also generate a signal to the foreign CMR system to delete the registration of the mobile cellular communications device 34, to avoid cluttering the CMR system's memory with unused information.

The mobile cellular communications device 34 can transmit a beacon-responsive signal which will be conveyed via the RECC to the MSC 24 and, in turn, forwarded to the data collection system 40, thus locating the mobile cellular communications device 34 for future forward communication between the data collection system 40 and the mobile cellular communications device 34. However, something must trigger the beacon-responsive signal. That is, without any stimulus indicating that the beacon-responsive signal is needed, a mobile cellular communications device 34 may travel between cells and CMR systems without generating a beacon-responsive signal, thereby remaining lost to the data collection system 40.

An exemplary embodiment of the present invention solves this problem by providing three stimuli that will cause the mobile cellular communications device 34 to generate a beacon-responsive signal. The first stimulus occurs when the mobile cellular communications device 34 makes a determination that it has entered another CMR system by recognizing a change in the SID or a dramatic change in the REGID contained in the control message transmitted by the CMR system. The second stimulus occurs when the mobile cellular communications device 34 recognizes a change in a standardized "beacon page." The last stimulus occurs when the mobile cellular communications device 34 does not receive an anticipated beacon page.

The first stimulus is that provided by a recognized change in the CMR system's SID signal or a dramatic change in the CMR system's REGID. The mobile cellular communications device 34, as with all conventional radiotelephones and cellular devices, can be programmed to monitor the FOCC of any CMR system within the coverage areas of which the device is located. Along with other data that is transmitted over the FOCC, conventional CMR systems transmit a CMR SID signal that identifies the CMR system. The SID is periodically transmitted within a control message over the FOCC. Some CMR systems use one switch for the entire system, while others use multiple switches. Each switch may have a unique switch number. When a cellular device travels between cells and/or CMR systems, it loses the signal from the CMR system it is departing and must establish communications with the new CMR system.

When the cellular device loses the old signal, it is said to "lose synch." When a mobile cellular communications device 34 loses synch with a CMR system, it will monitor the FOCC for the control message. If the SID contained in the received control message is different from the last SID received by the mobile cellular communications device 34, the mobile cellular communications device 34 knows that it has entered another CMR system. The mobile cellular communications device 34 can generate a beacon-responsive signal to inform the data collection system 40 of its new CMR system, so that any forward directed communications can be completed. Likewise, the CMR system can transmit a REGID within the control message. A drastic change in the REGID will typically indicate a change in CMR systems. In response to this perceived change, the mobile cellular communications device 34 can generate a beacon-responsive signal to inform the data collection system 40 of its new CMR system, so that any forward directed communications can be completed.

The need for the second stimulus means is manifest in CMR systems/cells that do not have a different SID than adjacent CMR systems/cells. In this situation, even if the mobile cellular communications device 34 loses synch, a subsequent monitoring of the FOCC will determine that the SID has not changed, indicating that the mobile cellular communications device 34 has not changed CMR systems/cells. This situation exists in some markets, most notably the Canadian market, in which CMR systems/cells throughout the entire country transmit the same SID. The solution to this problem is provided by the beacon page.

The beacon page is a page that is generated by CMR systems that support data messaging systems. Typically, the CMR system is stimulated to transmit a beacon page by the data collection system 40, via the first communications system or via other telephone facilities 28. Alternatively, the CMR system itself can be programmed to stimulate the transmission of a beacon page. As discussed above, a conventional radiotelephone page consists of the MIN of the radiotelephone for which an incoming call is destined. A conventional radiotelephone page is transmitted by the MSC and carried over the FOCC. As discussed in connection with the autonomous registration signal, a conventional page will be transmitted by the cell or cells that are serviced by the MSC with which a cellular device is registered as a roamer. The beacon page is also transmitted over the FOCC, by the MSC. However, the beacon page is a page that utilizes a reserved MIN rather than a predetermined identifying characteristic of a particular cellular device (e.g., the cellular device's MIN). That is, the beacon page represents a page with a MIN that identifies no particular radiotelephone or cellular device and yet triggers a response in any number of mobile cellular communications devices 34. The MIN is reserved in that the reserved MIN is not exclusive to any particular cellular device. For cellular devices such as the mobile cellular communications device 34 that are programmed to monitor the beacon page, a change in beacon page will indicate a change in CMR systems/cells.

Thus, when an exemplary mobile cellular communications device 34 travels between CMR systems/cells, it will recognize the fact that it has changed CMR systems/cells when it receives a beacon page that is different from that previously received. Even in CMR systems as described above that do not utilize unique SIDs, the beacon page can cause the mobile cellular communications device 34 to recognize this change of CMR systems and to generate a beacon-responsive signal. The beacon-responsive signal will enable the data collection system 40 to locate the mobile cellular communications device 34 for any required forward direction communications.

The final stimulus that can trigger the generation of a beacon-responsive signal in the mobile cellular communications device 34 is the absence of a beacon page. As discussed, the mobile cellular communications device 34 will be programmed to monitor the beacon page. CMR systems that support the data message system will transmit a beacon page at a regular interval. Therefore, when the mobile cellular communications device 34 does not receive a beacon page that it is anticipating, the mobile cellular communications device 34 will be alerted that it has traveled into a different CMR system The mobile cellular communications device 34 will attempt to look for a different CMR system that does generate a beacon page (i.e., a CMR system that supports the data message system).

Because of the critical nature of the beacon page to this invention, the details of the contents of a beacon page will be discussed. This discussion will be followed by a discussion of the mobile cellular communications device's 34 ability to locate a CMR system that generates a beacon page.

The Beacon Page

As discussed, it is a goal of the data collection system 40 to maintain the location of the mobile cellular communications devices 34 with which the data collection system 40 is charged with communicating. In the case where an SID is meaningless because of the non-distinctiveness of a particular SID (e.g., in Canada), the beacon page serves the function of triggering a mobile cellular communications device 34 to register with the data collection system 40, by transmitting a beacon-responsive signal to the data collection system via the RECC.

Still referring to FIGS. 1 and 7, the exemplary beacon page is designed to appear to a mobile cellular communications device 34 and to all other cellular devices as any other page. That is, the beacon page looks as though it is a page containing the MIN of a particular radiotelephone to which a call is being attempted. The beacon page will differ from a normal page, however, because it will contain a reserved MIN, which does not identify any particular radiotelephone or cellular device. Reserved MINs are MINs that are set aside for reserved applications, especially those applications not associated with the identification of a particular cellular device. The reserved MIN of the beacon page may identify any number of cellular devices. This multiple device response is desirable so that the beacon page is meaningful to all of the mobile cellular communications devices 34 within the CMR system's coverage area. This is accomplished by increasing the number of MINs to which the mobile cellular communications device 34 will respond.

An exemplary embodiment of the mobile cellular communications device 34 is capable of responding to pages containing up to ten discrete MINs which are stored in a look-up table in the mobile cellular communications device's 34 memory. Referring again to FIG. 3, the memory 76 is functionally connected to the controller 74 of the exemplary mobile cellular communications device 34. Those skilled in the art will appreciate that the present invention is capable of operating within the environment of a mobile cellular communications device 34 with any number of memory locations for storing MINs or with an external memory unit. TABLE 1 illustrates how a mobile cellular communications device's 34 memory may appear:

TABLE 1

| MIN 1 | 404-818-3700 |
| MIN 2 | 404-123-4566 |
| MIN 3 | 001-100-100* |
| MIN 4 | 001-100-9992 |
| MIN 5 | 001-100-9994 |
| MIN 6 | 001-100-9996 |
| MIN 7 | 001-100-9998 |
| MIN 8 | 001-100-9900 |
| MIN 9 | 001-100-9902 |
| MIN 10 | 001-100-99** |

The MIN 1 and MIN 2 locations may be dedicated to this particular mobile cellular communications device 34. On the other hand, MINs 3–10 may be reserved MINs that do not identify any particular mobile cellular communications device 34, but are used only for the specific purpose of generating a particular response from any number of mobile cellular communications devices 34. For example, a data collection system 40 may send out a page of 001-100-9994 which is recognized by all of the long-haul trucks in the CMR system over which the page was made. The page may also be coupled with a responsive action that causes the long-haul trucks to check inventory and report any available cargo space.

Additionally, each MIN in memory may include a wildcard character that effectively expands the capability of the mobile cellular communications device 34 to respond to pages of various MINs. This is illustrated in TABLE 1, by MIN 3 and MIN 9. A wildcard MIN is merely a means of further expanding the number of MINs to which a mobile cellular communications device 34 will respond. TABLE 2 illustrates all of the paged MINs to which the wildcard MIN3 memory location depicted in TABLE 1 will prompt a response:

TABLE 2

| MIN 3: | 001-100-100* |
| 1 | 001-100-1000 |
| 2 | 001-100-1001 |
| 3 | 001-100-1002 |
| 4 | 001-100-1003 |
| 5 | 001-100-1004 |
| 6 | 001-100-1005 |
| 7 | 001-100-1006 |

TABLE 2-continued

| 8 | 001-100-1007 |
| 9 | 001-100-1008 |
| 10 | 001-100-1009 |

As will be discussed below in connection with FIG. 8, cellular devices are often designed to monitor only odd-numbered MIN pages or only even-numbered MIN pages. In such devices, therefore, TABLE 2 will only contain 5 paged MINs to which the wildcard MIN3 memory location depicted in TABLE 1 will prompt a response (i.e., either odd-only or even-only MINs).

An exemplary CMR system generates only one beacon page throughout the CMR system's entire coverage area. The mobile cellular communications device 34 would receive the same beacon page at regular intervals as long as the mobile cellular communications device 34 remained within the CMR system's coverage area. As the mobile cellular communications device 34 traveled into the coverage area of an adjacent CMR system, the mobile cellular communications device 34 would receive the beacon page of the newly-entered CMR system. By comparing the new beacon page to the previously received beacon page, the mobile cellular communications device 34 is alerted to the fact that it has traveled into the new CMR system and generates a beacon-responsive signal to inform the data collection system 40 of its new location.

Figure 8:
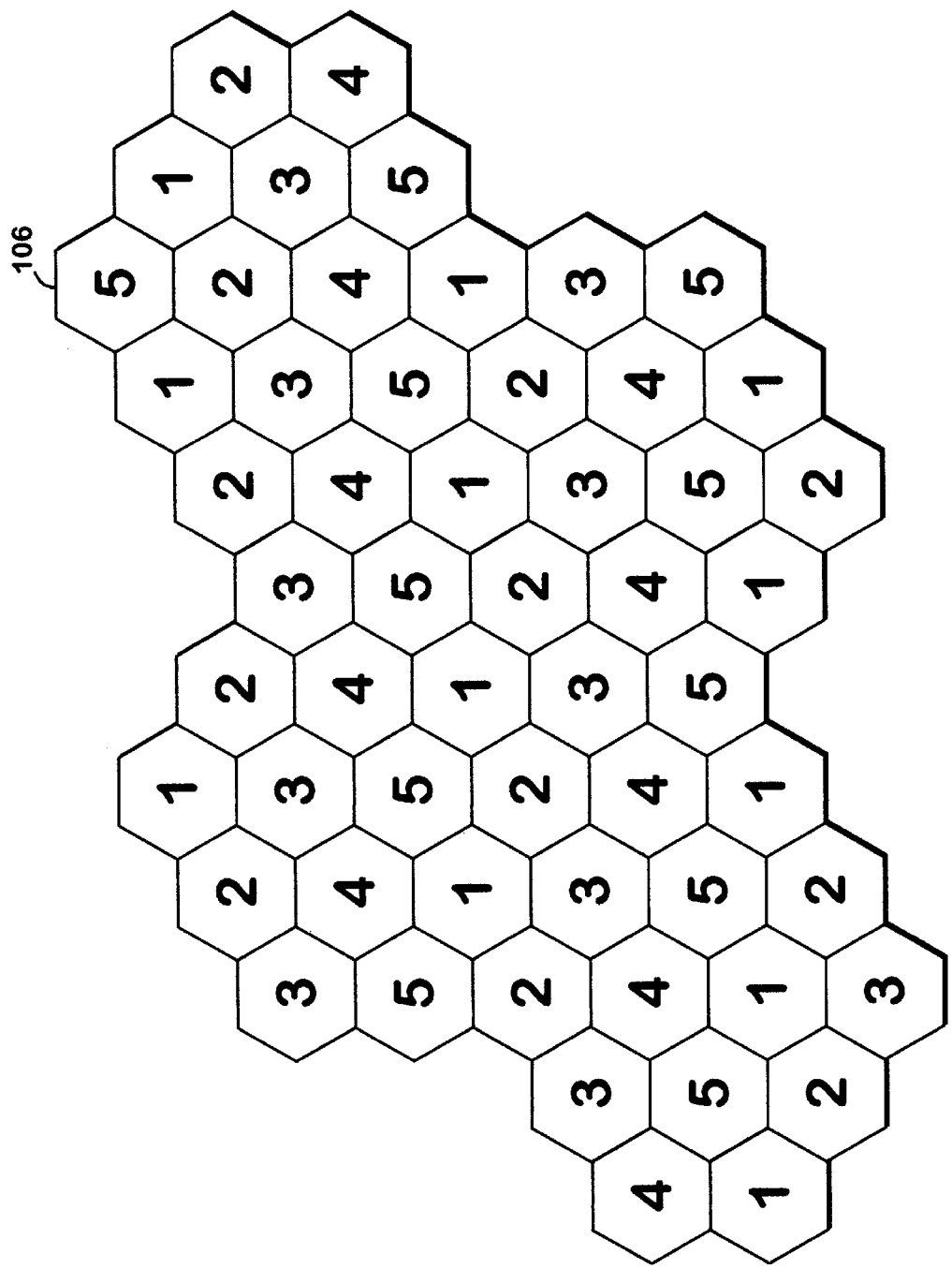
FIG. 8 is a block diagram of a reuse plan for assigning distinct identification numbers to a plurality of CMR systems.

FIG. 8 illustrates a "reuse plan" that illustrates an exemplary method of verifying that each CMR system has a beacon page that is distinct from every adjacent CMR system. The exemplary CMR system has a coverage area that is roughly hexagonal. As is illustrated in FIG. 8, each CMR system coverage area 106 can have a distinct beacon page from all of its "neighbors" with only distinct five beacon pages required. As discussed, the exemplary beacon page is in the form of a MIN. Therefore, the exemplary beacon page arrangement of the present invention can be implemented with only five reserved MINs.

Because some cellular devices are designed to only monitor odd-numbered MIN pages (odd-trained devices) or to only monitor even-numbered MIN pages (even trained devices), two reserved MINs may be required for every CMR system. Advantageously, the MIN memory of an exemplary mobile cellular communications device 34 described above in connection with TABLES 1 and 2 will accommodate this reuse plan. By using all of the MIN memory locations of the mobile cellular communications device 34, the mobile cellular communications device 34 can respond to any one of the ten MINs required to permit each of the five distinct CMR system coverage area identifier MINs to have an even and an odd MIN. Alternatively, if a wildcard system is utilized in a particular mobile cellular communications device 34, a single MIN memory location could accommodate all ten MINs.

Still another alternative exists, in which all mobile cellular communications devices 34 could be assigned even MINs or all mobile cellular communications devices 34 could be assigned odd MINs. This scheme would limit to five, the MINs required for generating unique beacon pages in adjacent CMR system markets.

As discussed, the third stimulus that will trigger a beacon-responsive signal from the exemplary mobile cellular communications device 34 is the absence of a beacon page. Because the mobile cellular communications device 34 will be programmed to monitor the beacon page, it will anticipate receiving a beacon page at regular intervals. The regularity of the beacon page may be determined by a universal standard, such that every mobile cellular communications device 34 is programmed to "look for" a beacon page every X minutes. Alternatively, the FOCC from each CMR system could transmit information to the mobile cellular communications device 34 indicating how often the mobile cellular communications device 34 can expect to receive a beacon page. Yet another option is for the mobile cellular communications device 34 to "learn" the interval by measuring the time between received beacon pages.

The value of the third stimulus is most plainly realized when the mobile cellular communications device 34 travels from a CMR system, in which the mobile cellular communications device 34 is receiving the beacon page, to a CMR system that does not provide a beacon page. After the time in which the anticipated beacon page should have been received has lapsed, the mobile cellular communications device 34 will recognize the absence of the beacon page and will generate a beacon-responsive signal. If, on the other hand, the mobile cellular communications device 34 were limited to generating beacon-responsive signals only on the basis of different received beacon pages, then the mobile cellular communications device 34 would not generate a beacon-responsive signal in the CMR system that did not provide beacon pages. Because the mobile cellular communications device 34 wouldn't receive a new beacon page it would not have a new beacon page to compare to a previously received beacon page. The comparison step would never be reached and a beacon-responsive signal would never be generated.

CMR Systems "A" and "B"

Another embodiment of the present invention accommodates the current state of cellular network communications. Conventional CMR systems are designed such that they communicate on one of two available channels. Specifically, a CMR system is either a "System A" or a "System B". This arrangement simply divides the available spectrum of cellular network frequencies in any given coverage area into two sets and designates one set to one CMR system and the other to another CMR system. This arrangement was originally adopted to allow for two competitors in any given cellular market.

As discussed, some CMR systems do not support data message communications. For example, such CMR systems may not generate a beacon page for use by mobile cellular communications devices 34. In the System A/B arrangement described above, it is common that only one of the CMR systems (either the "System A" or the "System B") will support data message communications. In such a case, the exemplary mobile cellular communications device 34 must test both channels to determine which to monitor for a beacon page.

If, after a predetermined amount of time, an exemplary mobile cellular communications device 34 determines that a beacon page is not being provided by the CMR system with which the mobile cellular communications device 34 is currently communicating, the mobile cellular communications device 34 will switch systems. If, after a predetermined period of time, the mobile cellular communications device 34 still does not receive a beacon page on the new system, then the mobile cellular communications device 34 will generate a beacon-responsive signal to inform the data collection system 40 of its location.

An Exemplary Method for Triggering a Beacon-Responsive Signal

Figure 9:
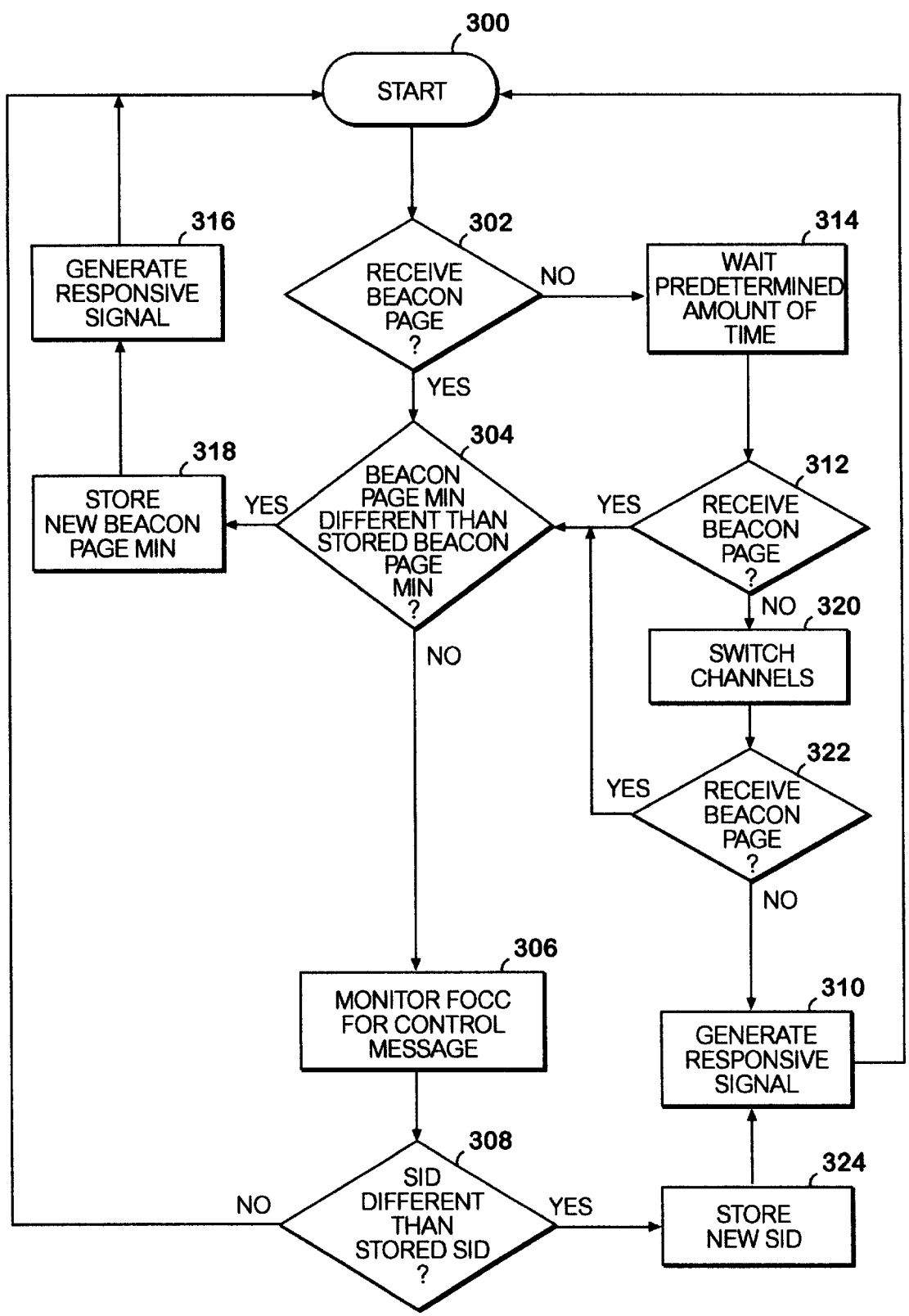
FIG. 9 is a flow chart diagram that shows the steps for a method for triggering an autonomous registration signal in an exemplary embodiment of the data message system.

As discussed, to effectively communicate a data message from the data collection system 40 toward a mobile cellular communications device 34 (i.e., a forward direction communication), the data collection system 40 must know in which CMR system the mobile cellular communications device 34 resides. Where a mobile cellular communications device 34 has moved between CMR systems, the mobile cellular communications device 34 must generate a beacon-responsive signal in order to register its location with the data collection system 40. As discussed above, the exemplary embodiment of the invention will generate a beacon-responsive signal in response to any one of three stimuli. FIG. 9 shows an exemplary method including steps for triggering a beacon-responsive signal in response to the stimuli discussed.

Referring now to FIGS. 1 and 9, the method starts at block 300. At decision block 302, if a beacon page is received, then the "YES" branch is followed to decision block 304. At decision block 304, the received beacon page is compared with a previously stored beacon page to determine whether there is a difference therebetween. If there is a difference between the stored beacon page and the received beacon page, the "YES" branch is followed to block 318. In block 318, the new beacon page is stored, for subsequent comparison to other received beacon pages. The method then goes to block 316, in which a beacon-responsive signal is generated. At this point, the method returns to the beginning and repeats itself as long as the mobile cellular communications device 34 is operative.

Returning to decision block 302, if a beacon is not received, then the method follows the "NO" branch to block 314. In block 314, the method waits for a predetermined amount of time before proceeding to the next step. Once the waiting step is completed, the method branches to decision block 312. At decision block 312, if a beacon page is received, then the "YES" branch is followed to decision block 304. At 304, if the received beacon page is the same as the stored beacon page, then the "NO" branch is followed to block 306. At block 306, the FOCC is monitored for a control message. The method then branches to decision block 308. At decision block 308, if the SID contained in the received control message is not different from the stored SID, then the "NO" branch is followed and the method branches back to step 300 and repeats itself as long as the mobile cellular communications device 34 device is operative. On the other hand, if at decision block 308, the SID is different from the stored SID, then the method branches to block 324. At block 324, the received SID is stored for subsequent comparison to other received SIDs. Then, the method branches to block 310, at which a beacon-responsive signal is generated. The method then branches back to step 300 and repeats itself as long as the mobile cellular communications device 34 device is operative.

Returning again to decision block 302, if a beacon page is not received, then the method follows the "NO" branch to block 314. In block 314, the method waits for a predetermined amount of time before proceeding to the next step. Once the waiting step is completed, the method branches to decision block 312. At decision block 312, if a beacon page is again not received, then the "NO" branch is followed to block 320. At block 320, the mobile cellular communications device's 34 channel is switched (e.g., from "A" Channel to "B" Channel), and the method proceeds to decision block 322. At decision block 322, if a beacon page is not received, the "NO" branch is followed to block 310. At block 310, a beacon-responsive signal is generated and the method then repeats itself. If, at decision block 322 at beacon page is received, the "YES" branch is followed to decision block 304, where the beacon page is compared to the stored beacon page, as described above.

In sum, the present invention provides a data message system for communicating data collected from data sources. The data message system includes a set of mobile data reporting devices, at least one MSC of a CMR system, and a data collection system connected to the MSC. Each mobile data reporting device monitors the operation of the data source to obtain selected data. The mobile data reporting devices can transmit data messages via the RECC toward the data collection system. The data collection system can locate the CMR system and MSC in which each mobile data reporting device is located, thereby eliminating the need to flood page multiple CMR systems and cells. Each CMR system transmits a beacon page identifying the CMR system. If the mobile reporting device detects a difference in received beacon pages, it transmits a beacon-responsive signal to the data collection system. The beacon-responsive signal contains information identifying the CMR system and MSC in which the mobile data reporting device is located. The beacon-responsive signal can also be triggered where the CMR system transmits an identification signal that is different than that last received by a mobile data reporting device within the CMR systems coverage areas. The beacon-responsive signal can also be triggered by the failure of a mobile data reporting device to receive an anticipated beacon page.

The above description is directed toward the exemplary embodiment of the present invention in which the beacon page is generated to coordinate a data message system having multiple mobile cellular communications devices for collecting data from data sources. However, those skilled in the art will appreciate the invention can be utilized within the context of other cellular network applications, such as radiotelephone communications and paging systems. The above description is not intended to limit the application of the invention to data message systems.

We claim:

1. In or for a cellular mobile radiotelephone (CMR) system having an array of cells for communicating with cellular mobile radiotelephones within coverage areas of the array of cells, a data message system for communicating selected data collected from a plurality of data sources, the data message system comprising:

a plurality of mobile data reporting devices, each of the mobile data reporting devices operative for monitoring the data sources to obtain the selected data, and for transmitting a reverse data message formatted as an initialization signal transmitted by one of the cellular mobile radiotelephones for communication via the CMR system;

a mobile switching center (MSC) for receiving the reverse data message via a reverse control channel (RECC) from each of the mobile data reporting devices operating within the coverage areas of the array of cells, and for transmitting a beacon page via a forward control channel (FOCC), wherein:

the beacon page is formatted as a page transmitted by an MSC over the FOCC when an incoming call is placed via the MSC to at least one of the cellular mobile radiotelephones, the beacon page comprising a mobile identification number (MIN), the MIN is a reserved MIN, and each mobile data reporting device has a memory for storing a plurality of MINs, at least one of the MINs corresponding to the reserved MIN;

a data collection system for collecting the selected data in response to receiving the reverse data message from the MSC via a communications link;

each of the mobile data reporting devices is further operative to receive the beacon page from the MSC, to compare the beacon page with a previously received beacon page, and to transmit a beacon-responsive signal to the MSC via the RECC when the beacon page is different from the previously received beacon page; and the MSC is operative to forward the beacon-responsive signal to the data collection system via the communications link, the data collection system responsive to the beacon-responsive signal to determine the CMR system within the coverage areas of which a particular mobile data reporting device is operating.

2. The apparatus of claim 1, wherein the MSC is further operative for transmitting a control message via the FOCC; and wherein each mobile data reporting device is further operative to receive the control message, to compare at least a portion of data contained in the control message with previously received data from a previously received control message, and to transmit the beacon-responsive signal when the data is different from the previously received data.

3. The apparatus of claim 2, wherein the control message is a System Parameter Overhead Message (SPOM) and the data comprises a system identification number (SID).

4. The apparatus of claim 2, wherein the control message is a Global Action Overhead Message (GAOM) and the data comprises a REGID.

5. The apparatus of claim 1, wherein each mobile data reporting device is further operative for transmitting the beacon-responsive signal in response to a failure to receive the beacon page within a predetermined time.

6. The apparatus of claim 1, wherein the CMR system comprises a first system and a second system, each having a plurality of FOCCs and corresponding RECCs; and wherein each mobile data reporting device is further operative to communicate using the first system rather than the second system when the mobile data reporting device fails to receive the beacon page via the second system within a predetermined time.

7. The apparatus of claim 1, wherein the beacon-responsive signal is formatted as a call origination signal.

8. The apparatus of claim 1, wherein the beacon-responsive signal is formatted as an autonomous registration signal.

9. The apparatus of claim 1, wherein the MSC is responsive to receiving the beacon-responsive signal to append a system identification number (SID) identifying the CMR system coverage areas in which the mobile data reporting device is located and a switch number identifying the MSC to the beacon-responsive signal and to transmit an appended beacon-responsive signal to the data collection system, thereby enabling the data collection system to transmit a forward data message to the mobile data reporting device responsible for transmitting the beacon-responsive signal by transmitting a page via the CMR system and MSC identified by the appended beacon-responsive signal.

10. The apparatus of claim 1, wherein the reserved MIN triggers a response in mobile data reporting devices within the coverage areas of the CMR system transmitting the beacon page rather than comprising a predetermined identifying characteristic of any particular mobile data reporting device.

11. The apparatus of claim 10, wherein each mobile data reporting device is simultaneously responsive to at least one of the plurality of stored MINs to perform a predetermined operation.

12. The apparatus of claim 11, wherein the predetermined operation includes transmitting the reverse data message to the MSC via the RECC.

13. The apparatus of claim 11, wherein the predetermined operation includes monitoring a particular one of the data sources.

14. The apparatus of claim 11, wherein the predetermined operation includes transmitting the beacon-responsive signal to the MSC via the RECC.

15. In or for a first cellular mobile radiotelephone (CMR) system for communicating with cellular mobile radiotelephones within coverage areas of an array of cells, the first CMR system comprising a plurality of mobile data reporting devices, each of the mobile data reporting devices operative for monitoring a plurality of data sources to obtain selected data, and for transmitting a reverse data message containing the selected data; a mobile switching center (MSC) for receiving the reverse data message from each of the mobile data reporting devices operating within the coverage areas of the array of cells; and a data collection system for collecting the selected data in response to receiving the reverse data message from the MSC via a communications link, a method for enabling the data collection system to determine a second CMR system in which a particular one of the mobile data reporting devices is operating, comprising the steps of:

receiving a control message via a forward control channel (FOCC) of the first CMR system;

in response to a failure to receive a control message within a predetermined time, transmitting a responsive signal indicating said failure;

in response to receiving the control message, comparing data contained in the control message to previously received data contained in a previously received control message;

in response to the data contained in the control message being different from the previously received data, transmitting a responsive signal to the MSC via a reverse control channel (RECC) of the second CMR system, and transmitting the responsive signal from the MSC to the data collection system via the communications link;

in response to receiving the responsive signal, determining the second CMR system within the coverage areas of which the particular mobile data reporting device is located.

16. The method of claim 15, wherein the control message is a System Parameter Overhead Message (SPOM) and the data comprises a system identification number (SID).

17. The method of claim 15, wherein the control message is a Global Action Overhead Message (GAOM) and the data comprises a REGID.

18. The method of claim 15, wherein the second CMR system comprises a first system and a second system, each having a plurality of FOCCs and corresponding RECCs, the method further comprising the step of:

communicating via the first system rather than the second system in response to a failure to receive the control message via the second system within a predetermined time.

19. The method of claim 15, wherein the control message is formatted as a page transmitted by the MSC when an incoming call is placed via the MSC to at least one of the cellular mobile radiotelephones, the control message comprising a mobile identification number (MIN).

20. The method of claim 19, wherein the MIN is a reserved MIN, wherein the reserved MIN triggers a response in any number of mobile data reporting devices within the coverage areas of the second CMR system transmitting the control message rather than comprising a predetermined identifying characteristic of any particular mobile data reporting device.

21. The method of claim 20, wherein each mobile data reporting device has a memory for storing a plurality of MINs to which the mobile data reporting device is responsive, at least one of the MINs corresponding to the reserved MIN.

22. The method of claim 21, wherein each mobile data reporting device is responsive to at least one of the plurality of stored MINs to perform a predetermined operation.

23. In or for a cellular mobile radiotelephone (CMR) system for communicating with cellular devices within coverage areas of an array of cells, the CMR system comprising a plurality of mobile data reporting devices, each of the mobile data reporting devices operative for monitoring a plurality of data sources to obtain selected data, and for transmitting a reverse data message containing the selected data; a mobile switching center (MSC) for receiving the data message from each of the mobile data reporting devices operating within the coverage areas of the array of cells; and a data collection system for collecting the selected data in response to receiving the data message from the MSC via a communications link, a location registration system for locating a particular one of the mobile data reporting devices, the location registration system comprising:

the MSC operative to transmit a beacon page via a forward control channel (FOCC) of the CMR system for reception by each of the mobile data reporting devices located within the coverage areas of the CMR system;

each mobile data reporting device, in response to the beacon page, operative to transmit to the MSC, via a reverse control channel (RECC) of the CMR system, a beacon-responsive signal, when the mobile data reporting device determines that the received beacon page is different from a previously received beacon page;

wherein the data collection system is responsive to receiving the beacon-responsive signal from the MSC to determine an operational location of a particular one of the mobile data reporting devices responsible for transmitting the beacon-responsive signal by identifying the CMR system within the coverage areas of which the particular mobile data reporting device is located.

24. The system of claim 23, wherein the MSC is further operative for transmitting a System Parameter Overhead Message (SPOM) containing a system identification number (SID) via the FOCC; and wherein each mobile data reporting device is further operative to receive the SPOM, to compare the SID contained therein with a previously received SID, and to transmit the beacon-responsive signal when the SID is different from the previously received SID.

25. The system of claim 23, wherein each mobile data reporting device is further operative for transmitting the beacon-responsive signal in response to a failure to receive the beacon page within a predetermined time.

26. The system of claim 23, wherein the beacon-responsive signal is formatted as a call origination signal.

27. The system of claim 23, wherein the beacon-responsive signal is formatted as an autonomous registration signal.

* * * * *